(12) United States Patent
Morimoto

(10) Patent No.: US 6,820,494 B2
(45) Date of Patent: Nov. 23, 2004

(54) CAPACITANCE TYPE SENSOR

(75) Inventor: Hideo Morimoto, Yamatokohriyama (JP)

(73) Assignee: NITTA Corporation, Osaka (JP)

(*) Notice: Subject to any disclaimer, the term of this patent is extended or adjusted under 35 U.S.C. 154(b) by 0 days.

(21) Appl. No.: 10/617,103

(22) Filed: Jul. 10, 2003

(65) Prior Publication Data

US 2004/0104727 A1 Jun. 3, 2004

(30) Foreign Application Priority Data

Jul. 12, 2002 (JP) .......................... 2002-203701

(51) Int. Cl.⁷ .............................. G01B 7/16; G01L 1/00

(52) U.S. Cl. ........................................................ 73/780

(58) Field of Search .................... 73/862.61, 862.046; 324/409, 686, 662; 250/370.01; 345/174

(56) References Cited

U.S. PATENT DOCUMENTS

| | | | |
|---|---|---|---|
| 5,237,284 A | * 8/1993 | Van Der Valk | 324/662 |
| 5,343,766 A | * 9/1994 | Lee | 73/862.61 |
| 5,394,096 A | * 2/1995 | Meyer | 324/686 |
| 6,370,965 B1 | * 4/2002 | Knapp | 73/862.046 |
| 6,530,283 B2 | 3/2003 | Okada et al. | 73/780 |
| 2002/0190727 A1 | 12/2002 | Morimoto | 324/661 |

\* cited by examiner

Primary Examiner—Edward Lefkowitz
Assistant Examiner—Octavia Davis
(74) Attorney, Agent, or Firm—Osha & May L.L.P.

(57) ABSTRACT

In a capacitance type sensor of the present invention, a two-layer structure of a sensor unit is provided by capacitance elements comprising capacitance element electrodes and a displacement electrode arranged opposite to the capacitance element electrodes, and domed switches comprising contact electrodes and switching electrodes spaced apart from the contact electrodes being arranged to overlap with each other with respect to a displacement direction of an operating button.

14 Claims, 20 Drawing Sheets

CAPACITANCE TYPE SENSOR

BACKGROUND OF THE INVENTION

1. Field of the Invention

The present invention relates to a capacitance type sensor suitably used for detecting a force applied from outside.

2. Description of the Related Art

A capacitance type sensor is in general use as a device for converting magnitude and direction of a force applied by an operator into electric signal. For example, a device having the capacitance type sensor for inputting operation of multidimensional direction incorporated as a so-called joystick is used as an input device of a mobile phone.

A capacitance type sensor can be used to input an operation having a specified dynamic range as a magnitude of a force applied by an operator. Among others, a capacitance type force sensor having a capacitance element formed by two electrodes to detect an applied force on the bags of changes of capacitance values caused by variations of distance between the electrodes is now in practical use in a variety of fields in terms of the advantage that the structure can be simplified to reduce costs.

For example, Japanese Laid-open (Unexamined) Patent Publication No. Hei 7(1995)-200164 discloses a capacitance type sensor 510 as shown in FIG. 21. The capacitance type sensor 510 has a substrate 520, an elastic rubber plate 530 disposed over the substrate 520, an electrode part 540 disposed on a lower surface of the elastic rubber plate 530, an electrode part 500–504 arranged on an upper surface of the substrate 520 (See FIG. 22), a presser plate 560 for fixedly supporting the elastic rubber plate 530 to the substrate 520, and an electronic device 580 arranged on a lower surface of the substrate 520. The electrode part 500–604 comprises electrodes part 501, 502 arranged to be symmetric with respect to the Y-axis, electrodes part 503, 504 arranged to be symmetric with respect to the X-axis, and an annular electrode part 500 arranged around the outside of those electrodes part. The periphery of the electrode part 540 is in contact with the electrode part 500 connected to ground and thus is connected to ground through the electrode part 500.

When an operator presses down the elastic rubber plate 530, the electrode part 540 is displaced downwardly increasingly with the displacement force, so that the distances between the electrode part 540 and the four electrodes part 501–504 are changed. Then, the capacitance values of the capacitance elements formed between the four electrodes part 501–504 and the electrode part 540 are changed. By detecting the changes of the capacitance values, magnitude and direction of a force applied by the operator can be recognized.

This capacitance type sensor 510 is suitably used for a device that can detect magnitude of a force applied by the operator when pressing down the elastic rubber plate 530, but is not suitable for a device having the switch function of selectively switching between two different modes (e.g. on-state and off-state). Accordingly, when this capacitance type sensor is built in equipment as a device having a multidirectional switch function, the capacitance type sensor can hardly be used as it is and is required to add switch functions corresponding to the respective directions.

SUMMARY OF THE INVENTION

It is an object of the present invention to provide a capacitance type sensor applicable to either of a device for sensing magnitude of a force for each direction and a device having switch function.

In accordance with the first aspect of the present invention, there is provided a capacitance type sensor comprising a detective member, a first electrode being opposite to the detective member, a second electrode arranged between the detective member and the first electrode and constituting capacitance elements with the first electrode, the second electrode being displaceable in a same direction as the detective member when the detective member is displaced, one or more first switching electrodes being opposite to the detective member, and one or more second switching electrodes arranged between the detective member and the first switching electrode(s) in such a relation as to be opposite to the first switching electrode(s) and also spaced apart from the first switching electrodes), the second switching electrodes being contactable with the first switching electrodes increasingly with displacement of the detective member, wherein the first and second switching electrodes are arranged to overlap with the first and second electrodes with respect to a displacement direction of the detecting member, and wherein the capacitance type sensor is capable of recognizing the displacement of the detective member on the basis of a detection, using a signal input to the first electrode, of a change in capacitance value of the capacitance element caused by a change in distance between the first electrode and the second electrode.

According to this construction, since displacement of the detective member is recognized by detecting variations of the capacitance values of the capacitance elements caused by changes in distance between the first electrode and the second electrode, magnitude of a force applied to the detective member from outside can be recognized. Also, since contact of the first switching electrodes with the second switching electrodes) can be recognized, this can be used as the switching function. Accordingly, the capacitance type sensor of the invention can be used as a device having the function of outputting the displacement of the detective member (the magnitude of a force applied to the detective member from outside) in the form of signal (analog signal) and/or a device having the switch function. Thus, this capacitance type sensor has the function as a composite device useable as either of the former device and the latter device, so that the need to re-create the sensor for either of the purposes mentioned above is eliminated.

The first and second switching electrodes and the first and second electrodes are arranged to overlap with each other with respect to the displacement direction of the detective member (arranged in two layers with respect to a vertical direction, for example). This can practically solve the problem, involved in the arrangement wherein the first and second switching electrodes are disposed in a plane substantially common with the first and second electrodes, that due to the first and second switching electrodes being disposed inside of the first electrode or the second electrode, an effective area for the first electrode or the second electrode is reduced, causing significant reduction in sensitivity of the capacitance type sensor. This can also solve the problem that due to the first and second switching electrodes being disposed outside of the first electrode or the second electrode, a relatively large area is required for placement of the electrodes included in the sensor, causing increase in size of the sensor.

The expression that "displacement of the detective member can be recognized" has substantially the same meaning as the expression that "a force applied to the detective member from outside".

The capacitance type sensor of the present invention may further comprise a first substrate disposed on the side opposite to the second electrode with respect to the first electrode and having the first electrode on its surface, a second substrate disposed on the side opposite to the first electrode with respect to the second electrode and having the second electrode on its surface, a first switching substrate disposed on the side opposite to the second switching electrode(s) with respect to the first switching electrodes and having the first switching electrodes on its surface, and a second switching substrate disposed on the side opposite to the first switching electrode(s) with respect to the second switching electrodes and having the second switching electrodes on its surface. According to this construction, since the first and second electrodes and the first and second switching electrodes are arranged on the substrate, those electrodes can be set in proper position on the substrate easily, thus providing simplified production process of the sensor.

In the capacitance type sensor of the present invention, the first substrate, the second substrate, the first switching substrate and the second switching substrate may be formed by a single common substrate having flexibility. According to this construction, the sensor is produced by arranging the respective electrodes on a single common substrate, first, and, then, folding the common substrate. This can provide simplified production process of the sensor. In addition, since the sensor unit of the sensor of the present invention is formed as a unit (unitized), even when appearance of the sensor or the detecting part is modified, a commonly available sensor unit can be obtained. Further, in this case, since the sensor unit can be placed on a circuit board on which for example a circuit pattern (wiring) is formed, an effective wiring area of the circuit board need not be reduced.

In the capacitance type sensor of the present invention, the first electrode, the second electrode, the first switching electrode, and the second switching electrode may be all arranged on one side of the common substrate. According to this construction, since all the electrodes are arranged on the common substrate, the production process of the sensor can be simplified further and the production costs can be reduced further.

In the capacitance type sensor of the present invention, the first and second switching electrodes may be disposed to be closer to the detective member than the first and second electrodes. According to this construction, the distance between the first switching electrode and the second switching electrode can be changed easily before the distance between the first electrode and the second electrode changes, which is preferable when the switch function of switching between the first switching electrode and the second switching electrode is given priority use.

In the capacitance type sensor of the present invention, there are provided two or more groups of the first and second electrodes or two or more groups of the first and second switching electrodes. According to this construction, the capacitance type sensor can be used as a device having the function of recognizing a multidimensional force and/or a device having the switch function by using the respective groups to recognize forces for different directions.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

In the following, certain preferred embodiments of the present invention are described with reference to the accompanying drawings.

Figure 1:
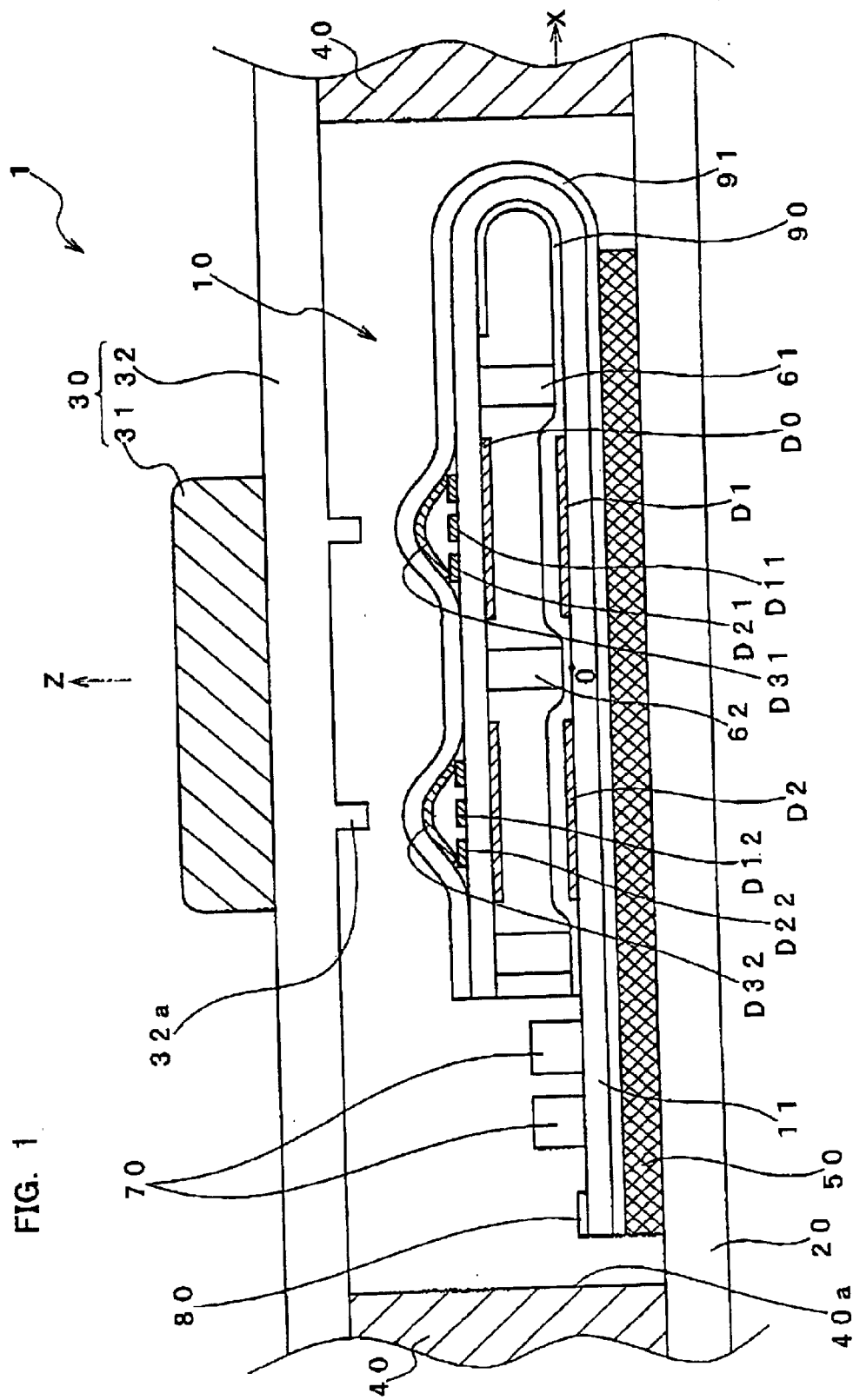
FIG. 1 is a schematic sectional view of a capacitance type sensor according to the first embodiment of the present inventions
Figure 2:
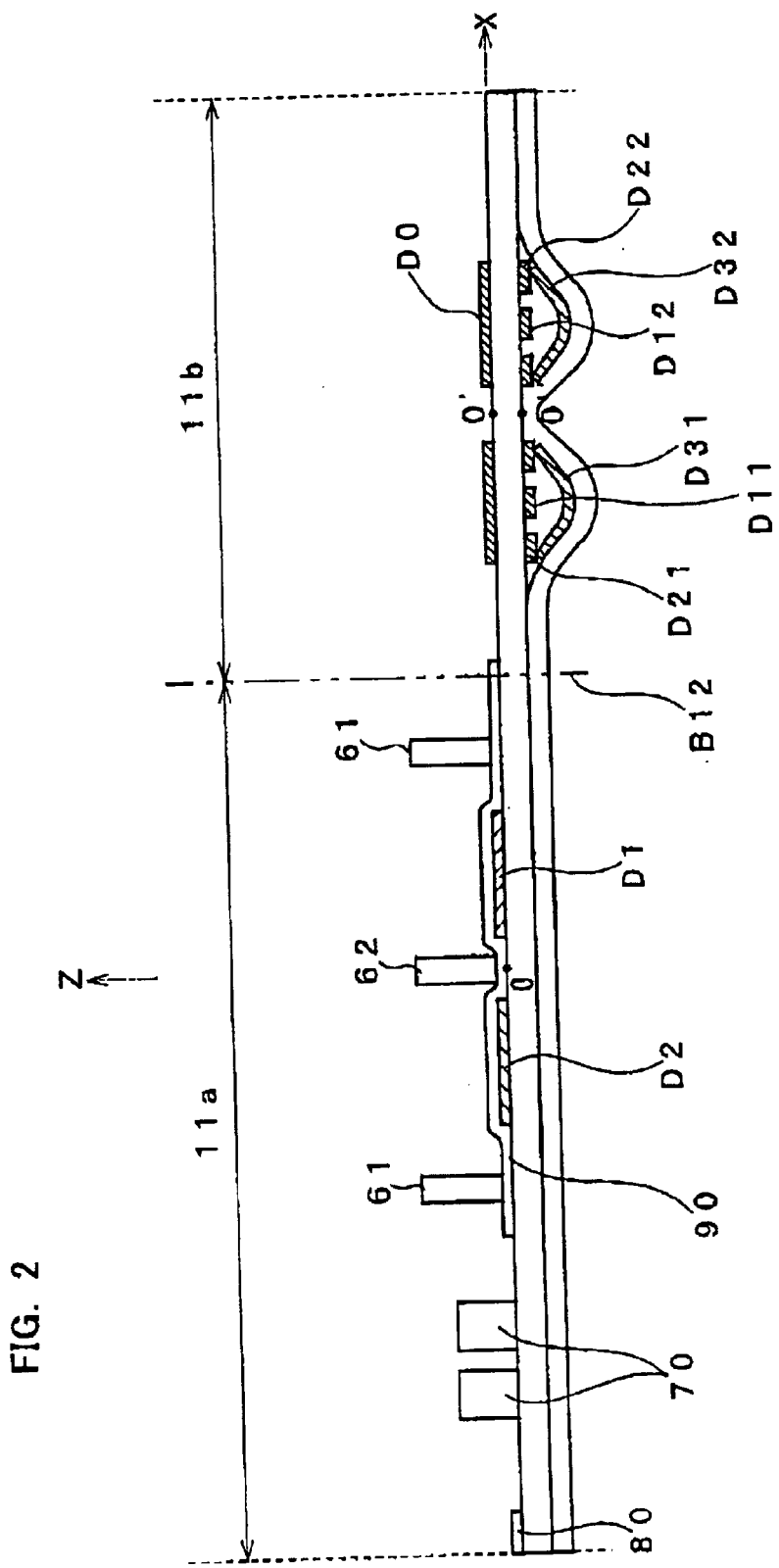
FIG. 2 is a sectional view showing an arrangement of a plurality of electrodes included in the capacitance type sensor of FIG. 1.
Figure 3:
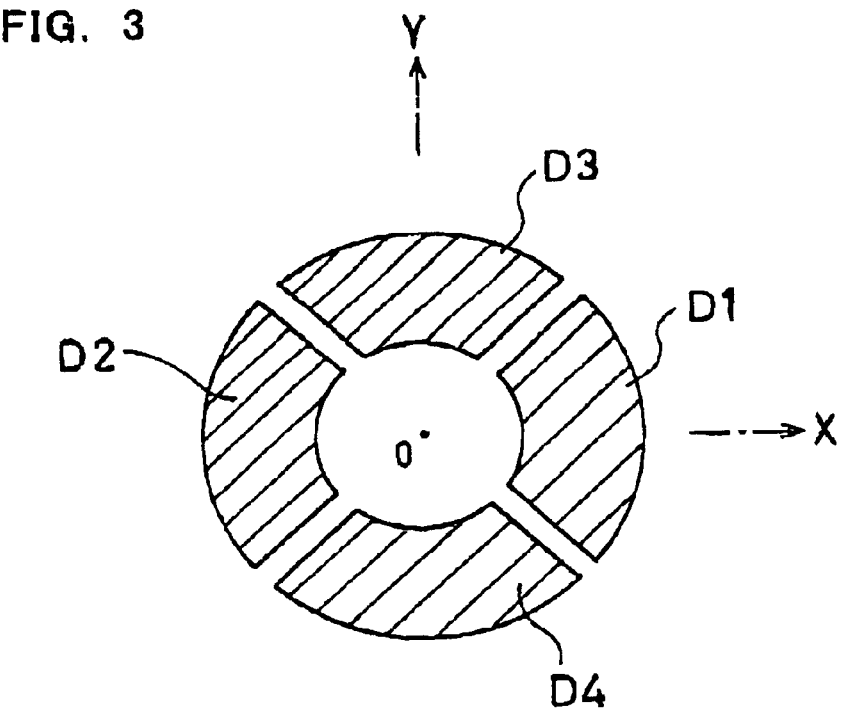
FIG. 3 is a view showing a rough configuration of the capacitance element electrodes included on the capacitance type sensor of FIG. 1.
Figure 4:
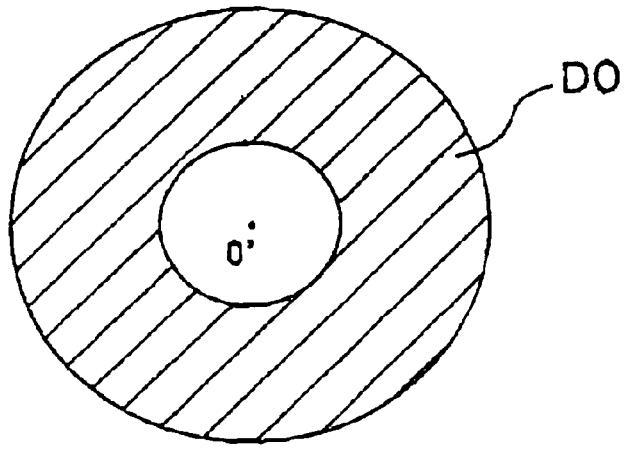
FIG. 4 is a view showing a rough configuration of a displacement electrode included in the capacitance type sensor of FIG. 1.
Figure 5:
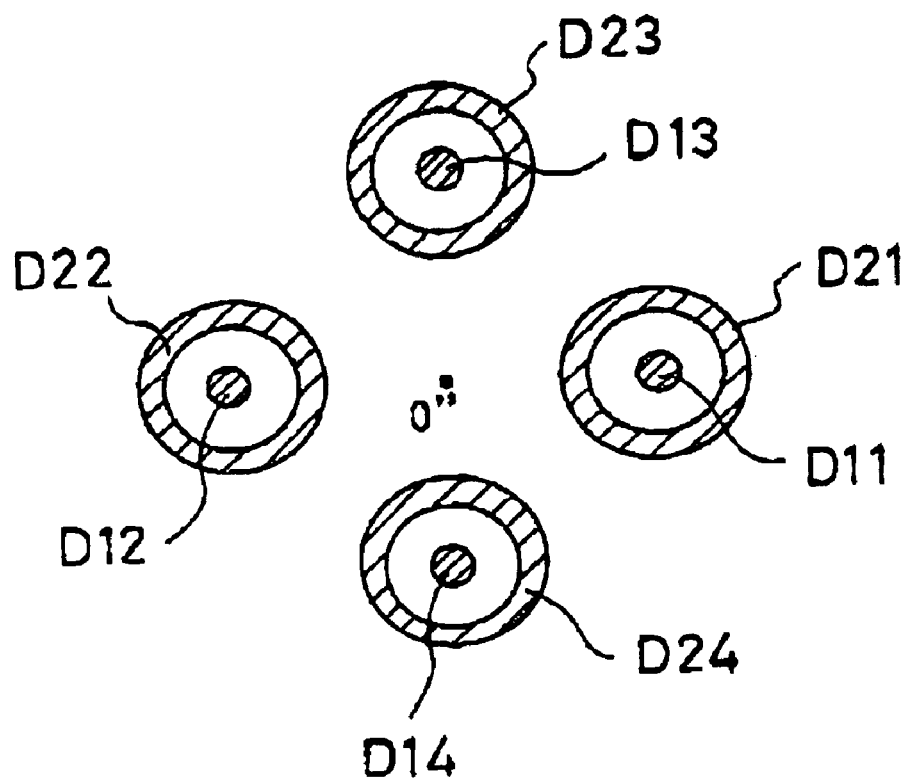
FIG. 5 is a view showing a rough configuration of contact electrodes included in the capacitance type sensor of FIG. 1.

First, the construction of a capacitance type sensor 1 according to the first embodiment of the present invention is described with reference to FIGS. 1-5. FIG. 1 is a schematic sectional view of a capacitance type sensor according to the first embodiment of the present invention. FIG. 2 is a sectional view showing an arrangement of a plurality of electrodes included in the capacitance type sensor of FIG. 1. FIG. 3 is a view showing a rough configuration of the capacitance element electrodes included on the capacitance type sensor of FIG. 1. FIG. 4 is a view showing a rough configuration of a displacement electrode included in the capacitance type sensor of FIG. 1. FIG. 5 is a view showing a rough configuration of contact electrodes included in the capacitance type sensor of FIG. 1.

The capacitance type sensor 1 has a sensor unit 10, a fixing plate 20 such as a substrate of e.g. information equipment of a mobile phone, an operating part 30 including an operating button 31 to which a force is applied from outside by an operator and the like, and a supporting member 40 for fixedly supporting the operating part 30 to the fixing plate 20. A lower surface of the sensor unit 10 is bonded to a front surface of the fixing plate 20 via adhesive 50.

The sensor unit 10 has a flexible printed circuit board (FPC) 11, capacitance element electrodes D1–D4 formed on the FPC 11 (only D1 and D2 are shown in FIG. 1), a displacement electrode D0, contact electrodes for switch D11–D14 and D21–D24 (only D11, D12 and D21, D22 are shown in FIG. 1), switching electrodes D31–D34 arranged on the FPC 11 (only D31 and D32 are shown in FIG. 1), spacers 61, 62, and sensor circuit components 70.

For convenience of explanation, a XYZ three-dimensional coordinate system is defined herein, as illustrated, and the placement of the parts will be described with reference to this coordinate system. That is to say, in FIG. 1, the origin O is defined at the center of the capacitance element electrodes D1–D4 on the FPC 11 bonded to the fixing plate 20 (See FIG. 3), letting the X-axis be in a horizontally rightward direction, the Y-axis be in a depth direction orthogonal to the vertical direction, when viewed from the paper, and the Z-axis be in a vertically upward direction. Therefore, a surface of the FPC 11 proximity of a region around which the capacitance element electrodes D1–D4 are formed defines a plane XY (in detail, a first surface 11a mentioned later), and the Z-axis passes substantially center positions of the sensor unit 10 and the operating button 31.

First, a rough configuration of the sensor unit 10 and a producing method thereof will be described. As shown in FIG. 2, the FPC 11 is a flat-plate-like member of a generally rectangular shape and is formed, for example, of flexible material such as PET film. The FPC 11 is divided into a first surface 11a and a second surface 11b. The first surface 11a and the second surface 11b are divided by a boundary line B12 indicated by a chain double-dashed line in FIG. 2. An area of the first surface 11a is larger than an area of the second surface 11b. The boundary line B12 serves as a folding line along which the FPC 11 is folded.

The origin O is defined on a surface of the first surface 11a of the FPC 11 (an upper surface in FIG. 2), as mentioned above. When the FPC 11 is folded to complete the sensor unit 10, the Z-axis passes through the second surface 11b at around its center, as shown in FIG. 1. Accordingly, a front side of the second surface 11b (an upper surface as viewed in FIG. 2 or a lower surface as viewed in FIG. 1) and a back side of the same 11b (a lower surface as viewed in FIG. 2 or an upper surface as viewed in FIG. 1) are taken here to have points O' and O" corresponding to the original point O at around the centers thereof, respectively.

As shown in FIGS. 2 and 3, the capacitance element electrodes D1–D4 of a general sector form corresponding to an X-axis positive direction, an X-axis negative direction, a Y-axis positive direction, and a Y-axis negative direction, respectively, and positioned symmetrically with respect to the original point O are formed on the first surface in a screen printing using conductive ink using silver or carbon as raw material. A thin resin sheet (a cover layer) 90 is laid over the FPC 11 to cover it, while closely contacting with the entire upper surfaces of the capacitance element electrodes D1–D4.

An annular spacer 61 disposed around the outside of the capacitance element electrodes D1–D4 and a circular spacer 62 disposed around the inside of the same are disposed on the resin sheet 90 laid over the first surface 1a. The spacers 61, 62 have the function of fixing a folded part of the FPC 11 (a second surface 11b) and the function of keeping the spaces between the capacitance element electrodes D1–D4 and the displacement electrode D0, between which the capacitance elements are formed, at a specified space when the operating button 31 is not operated. The spacers 61, 62 each have a height (thickness) larger than the sum of thicknesses of the capacitance element electrodes D1–D4, the resin sheet 90 and the displacement electrodes D0.

The spacers 61, 62 may be formed by adhesive bonding a thin film to their respective surfaces or by printing a conductive or non-conductive thick film thereto, or by an adhesive layer used to fix the FPC 11 when folded.

An annular displacement electrode DO with center at the point O' is formed on the second surface 11b in a screen printing using conductive ink using silver or carbon as raw material, as shown in FIGS. 2 and 4. The displacement electrode D0 has an outer diameter substantially equal to a diameter of a circle formed by connecting outer circular arcs of the capacitance element electrodes D1–D4. It has an inner diameter substantially equal to a diameter of a circle formed by connecting inner circular arcs of the capacitance element electrodes D1–D4. When the FPC 11 is folded to complete the sensor unit 10, the displacement electrode D0 comes to be opposite to any of the capacitance element electrodes D1–D4, so that the capacitance elements are formed between the both, as mentioned later. The displacement electrode D0 need not necessarily be formed in an annular form. It may be formed in a circular form. In this embodiment, the displacement electrode D0 is formed in an annular form in order that the spacers 61, 62 have a uniform height.

Contact electrodes D11–D14, D21–D24 are formed on the back side of the second surface 11b in the screen printing using conductive ink using silver or carbon as raw material, as shown in FIGS. 2 and 5. The contact electrodes D11–D14 have a circular form and the contact electrodes D21–D24 have an annular form. These contact electrodes are arranged in pairs, and the contact electrodes D11–D14 are disposed inside of the contact electrodes D21–D24, respectively.

As shown in FIG. 2, switching electrodes D31–D34 formed of a metal and having a dome form are arranged under the pairs of contact electrodes D11–D14 and D21–D34 in such a relation that they contact with the contact electrodes D21–D24 but spaced apart from the contact electrodes D11–D14.

Four domed switches DS1–DS4 (FIG. 6) thus formed by the switching electrodes DS1–D34 and the contact electrodes D11–D14, D21–D24 are arranged to correspond to the X-axis positive direction, the X-axis negative direction, the Y-axis positive direction and the Y-axis negative direction, respectively. A thin resin sheet (a cover layer) 91 is laid over the back side of the first surface and the back side of the second surface to cover the FPC 11, while closely contacting with the entire upper surfaces of the four domed switches DS1–DS4.

When the FPC 11 is folded to complete the sensor unit 10 (See FIG. 1), the domed switch DS1 including the switching electrode D31 comes to correspond to the X-axis positive direction, and the domed switch DS2 including the switching electrode D32 comes to correspond to the X-axis negative direction. Accordingly, in the state of FIG. 2, the domed switch DS1 is arranged to correspond to the X-axis negative direction and the domed switch DS2 is arranged to correspond to the X-axis positive direction.

Although the switching electrodes D31–D34 are fixed by using the resin sheet 91 in this embodiment, they may be fixed by using some other special member. Further, commercially available domed switch unit may be employed as the domed switches DS1–DS4.

For example, when the corresponding portion of the operating button 31 to the domed switch DS1 is operated, a downward force is applied to a nearly top portion of the switching electrode D31 and the related portion of the switching electrode DS1 is elastically deformed with a tactile feel and is brought into contact with the contact electrode D11. Thus, when the switching electrode D31 is formed by a metal dome, it can give a light tactile feel to an operator when the operator operates the domed switch DS1 to switch it from the off-state to the on-state. When such a tactile feel is not wanted, the switching electrode D31 need not necessarily be formed in the domed form. The same thing applies to the remaining domed switches DS2 to DS4.

Sensor circuit components 70 and a connector terminal 80 are disposed on the first surface 11a at a nearly end portion thereof on the side opposite to the second surface 11b. The sensor circuit components 70 comprise a number of electronic components. The connector terminal 80 has connecting terminals and the like connecting with the capacitance element electrodes D1–D4 and the contact electrodes D11–D14, D21–D24 formed on the FPC 11. The connector terminal 80 is used for electrically connecting the electrodes mentioned above to an external circuit such as a peripheral circuitry of a microcomputer. In addition to the electrodes mentioned above, a circuit pattern (wiring) and others are also formed on the FPC 11, though not shown.

In the manufacture of the sensor unit 10, after the electrodes are formed on the first surface 11a and the second surface 11b of the FPC 11, respectively, the second surface 11b is folded along the boundary line B12 between the first surface 11a and the second surface 11b so that the front side of the second surface 11b and the front side of the first surface 11a can be opposite to each other, as shown in FIG. 2. Then, a region of the second surface 11b outside or inside of the displacement electrode D0 on the second surface 11b is brought into contact with upper ends of the spacers 61, 62 arranged on the first surface 11a and is adhesive bonded thereto in that state. In this state, since the spacers 61, 62 have the height mentioned above, it defines a specified space between the upper surfaces of the respective capacitance element electrodes D1–D4 on the first surface 11a and the lower surface of the displacement electrode D0 on the second surface 11b (which correspond to the upper surfaces of the same in the stat of FIG. 2 in which the FPC 11 is not yet folded) when the operating button 31 is in the state of being not yet operated.

As mentioned above, the FPC 11 is folded along the boundary line B12 to complete the sensor unit 10 as shown in FIG. 1. This produces the capacitance type sensor 1 in which the four movable capacitance elements C1–C4 which are arranged, between the capacitance element electrodes D1–D4 and the displacement electrode D0, to correspond to the X-axis positive direction, the X-axis negative direction, the Y-axis positive direction and the Y-axis negative direction, respectively, and the four domed switches DS1–DS4 corresponding to the four directions mentioned above are arranged in two layers with respect to a vertical direction (displacement direction of the operating button 31).

The characteristic feature in production of the capacitance type sensor 1 of this embodiment is in that despite of the three-dimensional structure, the capacitance type sensor can be produced by using a single FPC 11 as the base on which the circuit and parts are properly arranged in place. This can provide the advantage that the sensor can be produced in a reduced number of assembling processes and at reduced production costs. Also, since the sensor unit 10 serving as the sensor part is formed as a unit (unitized), even when the operating part 30 is modified in external appearance design (e.g. shape of the operating button 31), the sensor unit 10 can be used as it is. Therefore, there is no need to reproduce the sensor part each time a new model is brought out, so that the costs involved in the model change are reduced significantly.

In the sensor unit 10 of this embodiment, the resin sheet 91 laid on the back side of the first surface 11a is fixed to the fixing plate 20 by adhesive 50, as mentioned above. The sensor unit 10 may be fixed, for example, to the fixing plate 20 by any other proper means than the adhesive 50, without limiting to the adhesive 50.

In the capacitance type sensor 1, the capacitance element electrode D1 and the domed switch DS1 are arranged to correspond to the X-axis positive direction, and the capacitance element electrode D2 and the domed switch DS2 are arranged to correspond to the X-axis negative direction, so that they are both used for detecting the components of the force from outside for the X-axis directions and used as a switch for X-axis directions. The capacitance element electrode D3 and the domed switch DS3 are arranged to correspond to the Y-axis positive direction, and the capacitance element electrode D4 and the domed switch DS4 are arranged to correspond to the Y-axis negative direction, so that they are both used for detecting the components of the force from outside for the Y-axis directions and used as a switch for Y-axis directions.

The FPC 11 may be formed of resin such as polyimide or equivalent. The capacitance element electrodes D1–D4, the contact electrodes D11–D14 and D21–D24, the displacement electrode D0, and the circuit pattern may be formed by forming copper foil or solder layer on the resin such as polyimide or equivalent.

The operating part 30 includes the operating button 31 disposed over the sensor unit 10 and a keypad base 32 for supporting the operating button 31 to the fixing plate 20 through the supporting member 40, as shown in FIG. 1. The operating part 30 is formed of material having elasticity such as silicon rubber.

The operating button 31 is a member of a generally disk-like form having a specified thickness. The operating button 31 has a diameter substantially equal to that of a circle formed by connecting outer circular arcs of the capacitance element electrodes D1–D4 on the FPC 11. The operating button 31 has, on an upper surface thereof, arrows (not shown) formed to indicate operating directions (moving directions of a cursor). The arrows are oriented to the X-axis positive/negative direction and the Y-axis positive/negative direction, respectively, or are formed to correspond to the capacitance element electrodes D1–D4, respectively.

The keypad base 32 has four protrusions 32a formed on a bottom thereof in positions corresponding to the capacitance element electrodes D1–D4 and the domed switches DS1–DS4. When the operating button 31 is operated, the switching electrodes D31–D34 of the domed switches DS1–DS4 are properly pressed at portions thereof proximity of the tops by the protrusions.

The supporting member 40 is a flat-plate-like member disposed on the fixing plate 20 and has an opening 40a of larger than the sensor unit 10 formed on the fixing plate 20 at a position corresponding to the sensor unit 10. The fixing plate 20 serves to support the sensor unit 10 and the operating part 30 and has preferably sufficient rigidity.

In this embodiment, the resin sheets 90, 91 laid over the FPC 11 have the function of protecting and reinforcing the circuit pattern formed by the electrodes and the copper foil formed on the FPC 11. The resin sheet need not particularly be laid over the capacitance element electrodes D1–D4 and the displacement electrode D0, but it is preferable that an insulating layer is laid over at least either of the capacitance element electrodes D1–D4 and the displacement electrode D0 by using the resin sheet. This is because when some force is applied to the operating button 31 so that the both electrodes are brought into contact with each other, the capacitance element cannot be formed therebetween. It is further preferable that the surfaces of the electrodes that are not covered by the resin sheet are given gold plating, silver plating or solder plating, for prevention of oxidization of the electrodes. In place of the resin sheet laid over the FPC 11, a resist film used with a rigid printed board may be used.

Although the electrodes and the sensor circuit components are all arranged on the flexible FPC in this embodiment, for example only the portion of the FPC on which the capacitance element electrodes and the sensor circuit components are mounted may be partly replaced with the rigid printed board.

In this embodiment, the FPC 11 is reduced in thickness to be as thin as 0.10–0.2 mm, including the resin sheets 90, 91, and the electronic components of the sensor circuit components 70 are also reduced in thickness to be as thin as 0.5 mm–0.48 mm. Accordingly, the sensor unit 10 can be significantly reduced in thickness to be as thin as 0.6 mm–1 mm in its entirety. As a result, the sensor unit 10 can be easily mounted in the space between the fixing plate 20 and the operating part 30 (the keypad base 32), when used, for example, in a mobile phone for which low-profile of equipment is required.

Figure 6:
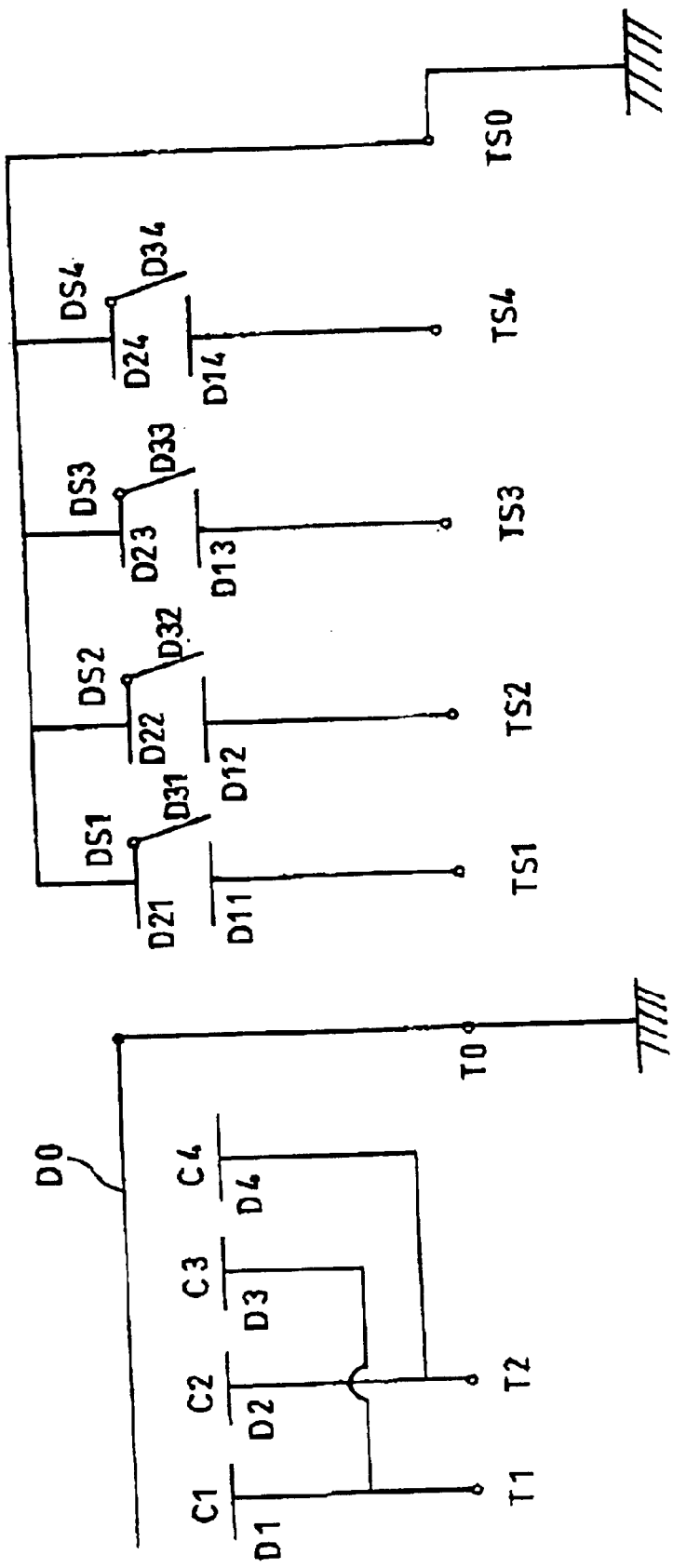
FIG. 6 is an equivalent cut diagram for the construction of the capacitance type sensor shown in FIG. 1.

Reference is now made to the circuitry of the capacitance type sensor 1 with reference to FIG. 6. FIG. 6 is an equivalent circuit diagram for the construction of the capacitance type sensor shown in FIG. 1.

In the capacitance type sensor 1, the capacitance elements C1–C4 formed by the displaceable displacement electrode D0 that is the common electrode and the individual fixed capacitance element electrodes D1–D4 are formed between the displacement electrode D0 and the capacitance element electrodes D1–D4 on the FPC 11. It can be said that the capacitance elements C1–C4 are variable capacitance elements that are each constructed to vary in capacitance value caused by displacement of the displacement electrode D0. The capacitance element electrodes D1–D4 are connected to the terminals T1, T2 and the displacement electrode D0 is connected to ground through the terminal T0.

Independent of the force sensor circuit, including the capacitance elements C1–C4, for detecting the force applied to the operating part 30, the switch circuit including the four domed switches DS1–DS4 is constructed. Accordingly, the each other's operation does not exert any electric influence on the other. Therefore, the output of the force sensor and the output of the switch circuit can be selectively used in accordance with use conditions of equipment on which the capacitance type sensor 1 is mounted. The contact electrodes D11–D14 are connected to terminals TS1–TS4, respectively. The contact electrodes D21–D24 are all connected to a terminal TS0 and are connected to ground through the terminal TS0.

Figure 7:
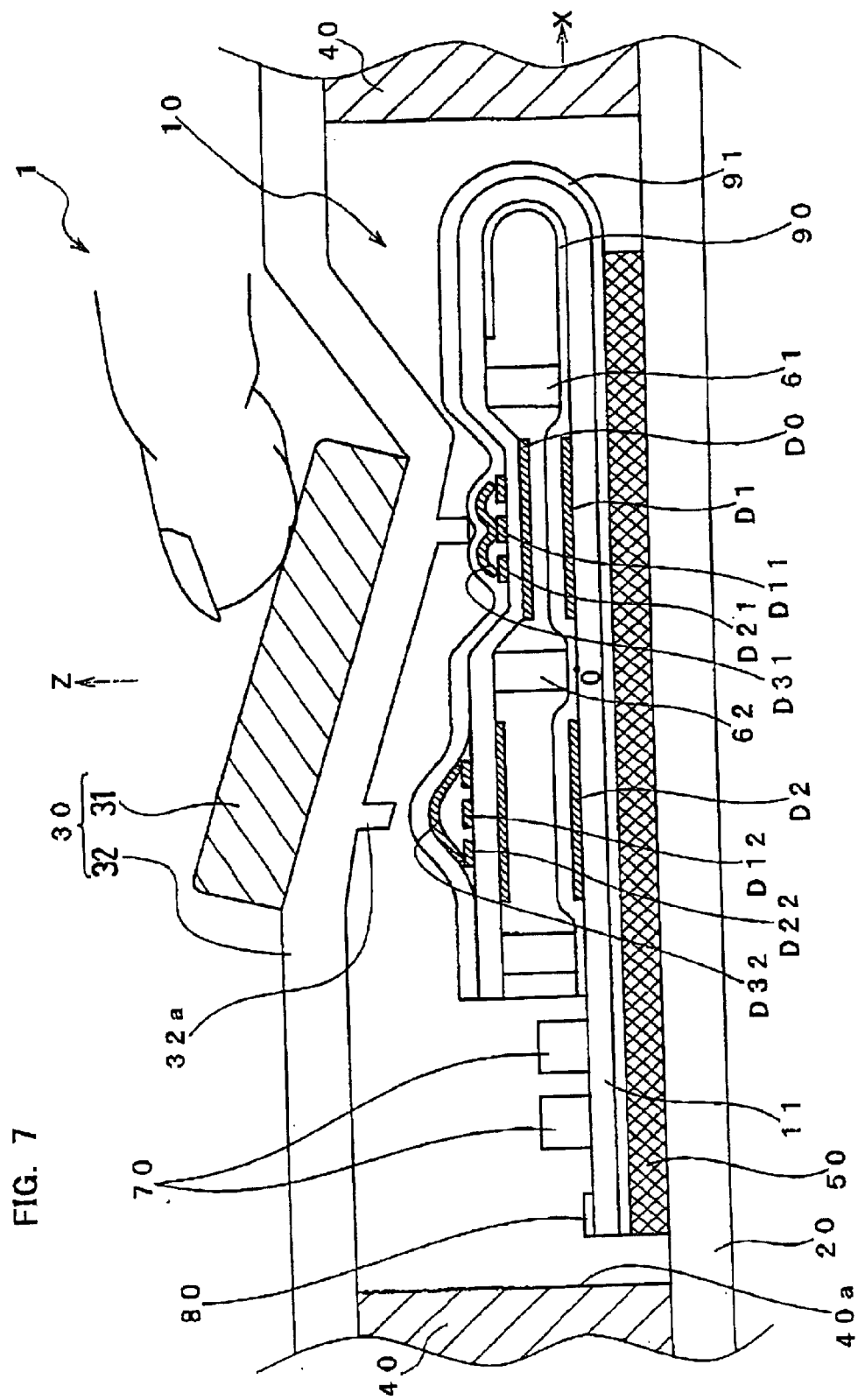
FIG. 7 is a schematic cross-sectional side view of the capacitance type sensor shown in FIG. 1 when an operating button is operated in an X-axis positive direction.
Figure 8:
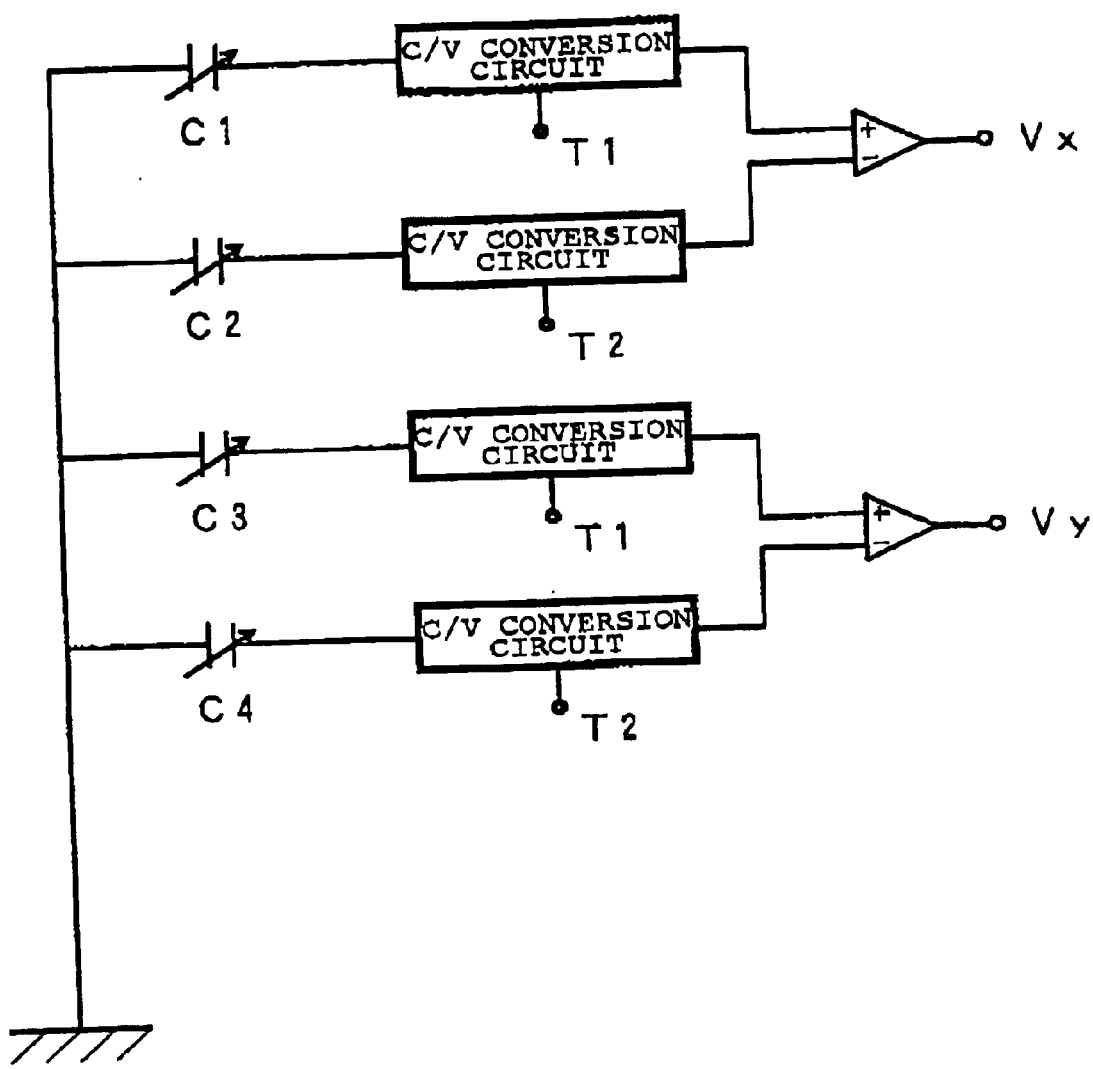
FIG. 8 is an illustration for explaining the way of deriving an output signal from a cyclic signal input to the capacitance type sensor shown in FIG. 1.

Next, operation of the thus constructed capacitance type sensor 1 according to this embodiment will be described with reference to FIG. 7. FIG. 7 is a schematic cross-sectional side view of the capacitance type sensor shown in FIG. 1 when the operating button is operated in the X-axis positive direction.

First, let us consider the case where the operating button 31 is operated in the X-axis positive direction in the state in which no force is applied to the operating button 31 shown in FIG. 1, as shown in FIG. 7, in other words, the case where a force to press down the operating button 31 (a force acting in the Z-axis negative direction) is applied to the operating button 31 from the arrow for the X-axis positive direction formed on the operating button 31.

By pressing down a portion of the operating button 31 corresponding to the X-axis positive direction, the keypad base 32 are elastically deformed and, as a result, the protrusion 32a of the keypad base 32 corresponding to the X-axis positive direction is displaced downwardly. This brings a front end portion of the protrusion 32a into contact with the resin sheet 91 laid on the back side of the second surface of the FPC 11.

Then, when the portion of the operating button 31 corresponding to the X-axis positive direction is pressed down further, a downward force is applied to a nearly top portion of the switching electrode D31 of the domed switch DS1. When the force does not reach a specified value, the switching electrode D31 is not displaced virtually. On the other hand, when the force reaches the specified value, the switching electrode D31 is elastically deformed and depressed drastically with buckling at the nearly top portion thereof and is brought into contact with the contact electrode D11. This brings the domed switch DS1 into the ON-state. At this time, the operator is given a pronounced tactile feel.

Thereafter, when the portion of the operating button 31 corresponding to the X-axis positive direction is pressed down further, the FPC 11 is elastically deformed, while the domed switch DS1 is kept in the on-state, so that the portion of the displacement electrode D0 corresponding to the X-axis positive direction is displaced downwardly. As a result, the space between the displacement electrode D0 and the capacitance element electrode D1 is varied. That is to say, when the operating button 31 is operated in the X-axis positive direction, only the capacitance element C1, out of the capacitance elements C1–C4, that varies in the space between the displacement electrode D0 and the capacitance element electrode D1–D4 varies in capacitance value. At this time, as detailed later, a cyclic signal input to the terminal T1 connected to the capacitance element electrode D1 passes through a delay circuit including the capacitance element C1 and thereby a phase lag is produced. An output signal Vx is derived by reading the phase lag.

At this time, the distances between the displacement electrode D0 and the capacitance element electrodes D2–D4 do not vary virtually and, accordingly, the capacitance values of the capacitance elements C2–C4 do not vary. Due to this, no phase lag is produced by the cyclic signal passing through the delay circuits including the capacitance elements C2–C4. When the operating button 31 is operated in the X-axis positive direction, the capacitance values of the capacitance elements C2–C4 may vary, but such a variation is small, as compared with the variation of the capacitance of the capacitance value element C1.

Next, reference is made to the way of deriving an output signal showing magnitude and direction of a force applied from outside to the operating button 31 from variations of the capacitance values of the capacitance elements C1–C4, with reference to FIGS. 8-11, FIG. 8 is an illustration for explaining the way of deriving an output signal from a cyclic signal input to the capacitance type sensor shown in FIG. 1. It is to be noted that variations of the output signals Vx, Vy indicate the magnitude and direction of an X-axis direction component of the force applied from outside and the magnitude and direction of a Y-axis direction component of the force applied from outside, respectively.

In order to derive the output signals Vx, Vy, cyclic signals, such as clock signals, are input to the terminals T1, T2. When the operating button 31 is displaced by a force from outside in the state in which the cyclic signals are being input to the terminals T1, T2, the domed switches DS1–DS4 are switched from the off-state to the on-state with the displacement of the operating button 31. Then, the displacement electrode D0 is displaced in the Z-axis negative direction and the distance between the electrodes of each of the capacitance elements C1–C4 varies and thereby the capacitance value of each of the capacitance elements C1–C4 varies. Then, phase lags in the cyclic signals input to the terminals T1, T2 are produced. By using the phase lags produced in the cyclic signal, the output signals Vx, Vy can be obtained which show the displacement of the operating button 31, i.e., the magnitude and direction of the force applied to the operating button 31 from outside for the X-axis direction and the magnitude and direction of the force applied thereto from outside for the Y-axis direction, respectively.

In further detail, when the cyclic signal A is input to the terminal T1, a cyclic signal B of identical in periodicity with but different in phase from the cyclic signal A is input to the terminal T2. When the capacitance values of the capacitance elements C1–C4 are varied by a force applied to the operating bottom 31 from outside at that time, a phase lag is produced in at least either of the cyclic signal A input to the terminal T1 and the cyclic signal B input to the terminal T2. Specifically, when the capacitance values of the capacitance elements C1, C3 vary, a phase lag is produced in the cyclic signal A input to the terminal T1. On the other hand, when the capacitance values of the capacitance elements C2, C4 vary, a phase lag is produced in the cyclic signal B input to the terminal T2.

When a force applied from outside includes an X-axis direction component, either the capacitance value of the capacitance element C1 varies to thereby produce the phase lag in the cyclic signal A input to the terminal T1 or the capacitance value of the capacitance element C2 varies to thereby produce the phase lag in the cyclic signal B input to the terminal T2, or both of them. The variations of the capacitance value of the capacitance elements C1, C2 correspond to the X-axis positive direction component of the force from outside and the X-axis negative direction component of the force from outside, respectively. The phase lag in the cyclic signal A input to the terminal T1 and the phase lag in the cyclic signal B input to the terminal T2 are read, for example, by an exclusive-OR gate or equivalent to derive the output signal Vx. A sign for variation of the output signal Vx indicates whether a component of a force from outside is of an X-axis positive direction or an X-axis negative direction, and an absolute value of variation of the output signal Vx indicates a magnitude of the X-axis direction component of the force.

When a force applied from outside includes a Y-axis direction component, either the capacitance value of the capacitance element C3 varies to thereby produce the phase lag in the cyclic signal A input to the terminal T1 or the capacitance value of the capacitance element C4 varies to thereby produce the phase lag in the cyclic signal B input to the terminal T2, or both of them. The variations of the capacitance value of the capacitance elements C3, C4 correspond to the Y-axis positive direction component of the force from outside and the Y-axis negative direction component of the force from outside, respectively. The phase lag in the cyclic signal A input to the terminal T1 and the phase lag in the cyclic signal B input to the terminal T2 are read, for example, by the exclusive-OR gate or equivalent to derive the output signal Vy. A sign for variation of the output signal Vy indicates whether a component of a force from outside is of a Y-axis positive direction or a Y-axis negative direction, and an absolute value of the output signal Vy indicates a magnitude of the Y-axis direction component of the force.

Figure 9:
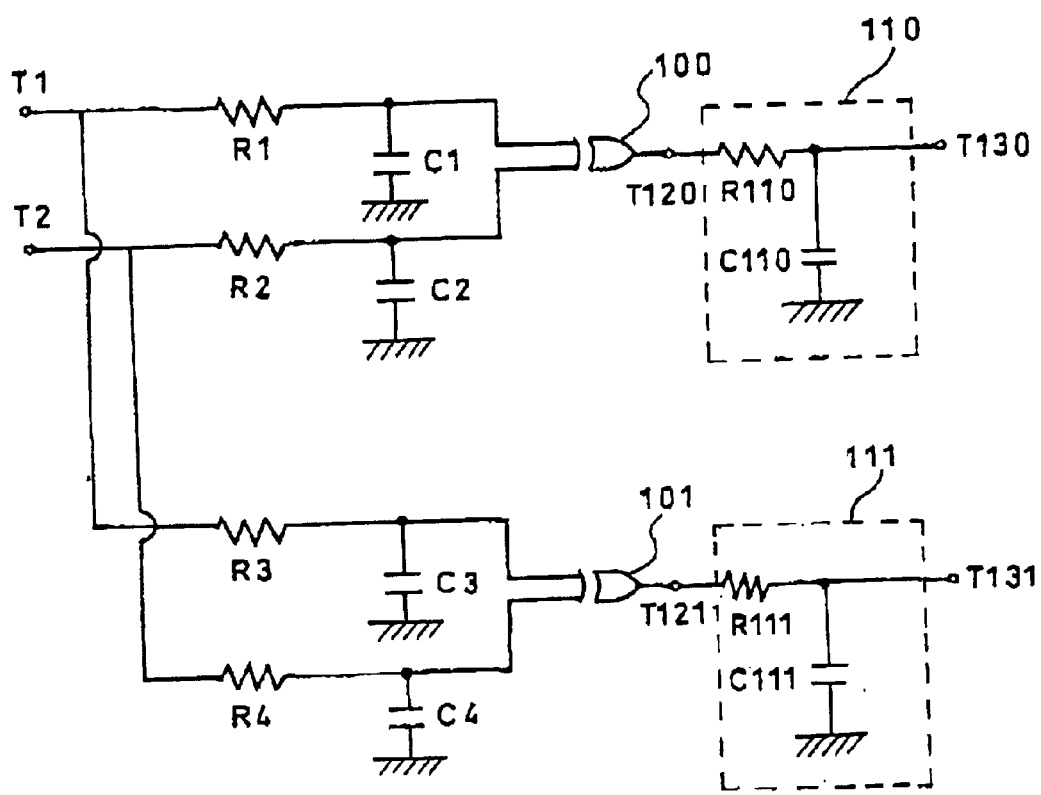
FIG. 9 is a circuit diagram showing a signal processing circuit of the capacitance type sensor shown in FIG. 1.

Next, reference is made to a signal processing circuit for deriving the output signals Vx, Vy by using the cyclic signals A, B input to the terminals T1, T2, with reference to FIG. 9. FIG. 9 is a circuit diagram showing a signal processing circuit of the capacitance type sensor shown in FIG. 1.

Resistance elements R1, R3 are connected to the terminal T1, and resistance elements R2, R4 are connected to the terminal T2. An EX-OR element 100 which is a logic element of the exclusive-OR gate is connected to output ends of the resistance elements R1, R2, and an EX-OR element 101 is connected to output ends of the resistance elements R3, R4. The output ends are connected to their respective terminals T120, T121. Low-pass filters (smoothing circuit) 110, 111 are connected to the terminals T120, T121, respectively, and the output ends are connected to the terminals T130, T131, respectively. The output ends of the resistance elements R1–R4 are connected to the capacitance element electrodes D1–D4, respectively. The capacitance elements C1–C4 are formed between the capacitance element electrodes D1–D4 and the displacement electrode D0. The displacement electrode D0 is connected to ground, as mentioned above.

The low-pass filters 110, 111 are used for converting the output signal Vx output from the EX-OR elements 100, 101 into analog voltage Vx'. Variation of the capacitance value of each of the capacitance elements C1–C4 is detected as variation of a duty ratio of waveform of the output signal Vx before input to the low-pass filters 110, 111. The signal is smoothed when passing through the low-pass filters 110, 111 and the duty ratio is converted to a voltage value, for use of it. The low-pass filter 110 is formed by the resistance elements R110 and the capacitance elements C110, and the low-pass filter 111 is formed by the resistance elements R111 and the capacitance elements C111. One of the two electrodes of the capacitance element C110, C111 that is not connected to the resistance element R110, R111 is connected to ground.

Thus, after the output signals Vx output from the EX-OR elements 100, 101 to the terminals T120, T121 are smoothed when passing through the low-pass filters 110, 111, the smoothed output signals Vx are output as the analog voltage Vx' to the terminals T130, T131. A value of the analog voltage Vx' varies in proportion to the duty ratio of the output signal Vx. Therefore, with an increase in the duty ratio of the output signal Vx, the value of the analog voltage Vx' increases. On the other hand, with a decrease in the duty ratio of the output signal Vx, the value of the analog voltage Vx' decreases. When the duty ratio of the output signal Vx does not vary virtually, the value of the analog voltage Vx' does not vary virtually, either.

Figure 10:
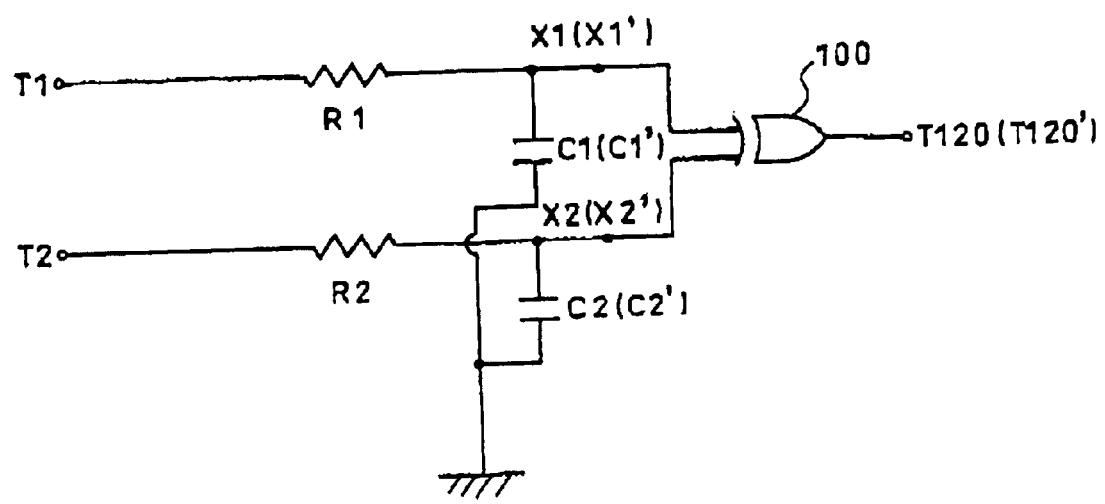
FIG. 10 is a circuit diagram showing a signal processing circuit for components for the X-axis direction of the capacitance type sensor shown in FIG. 1.
Figure 11:
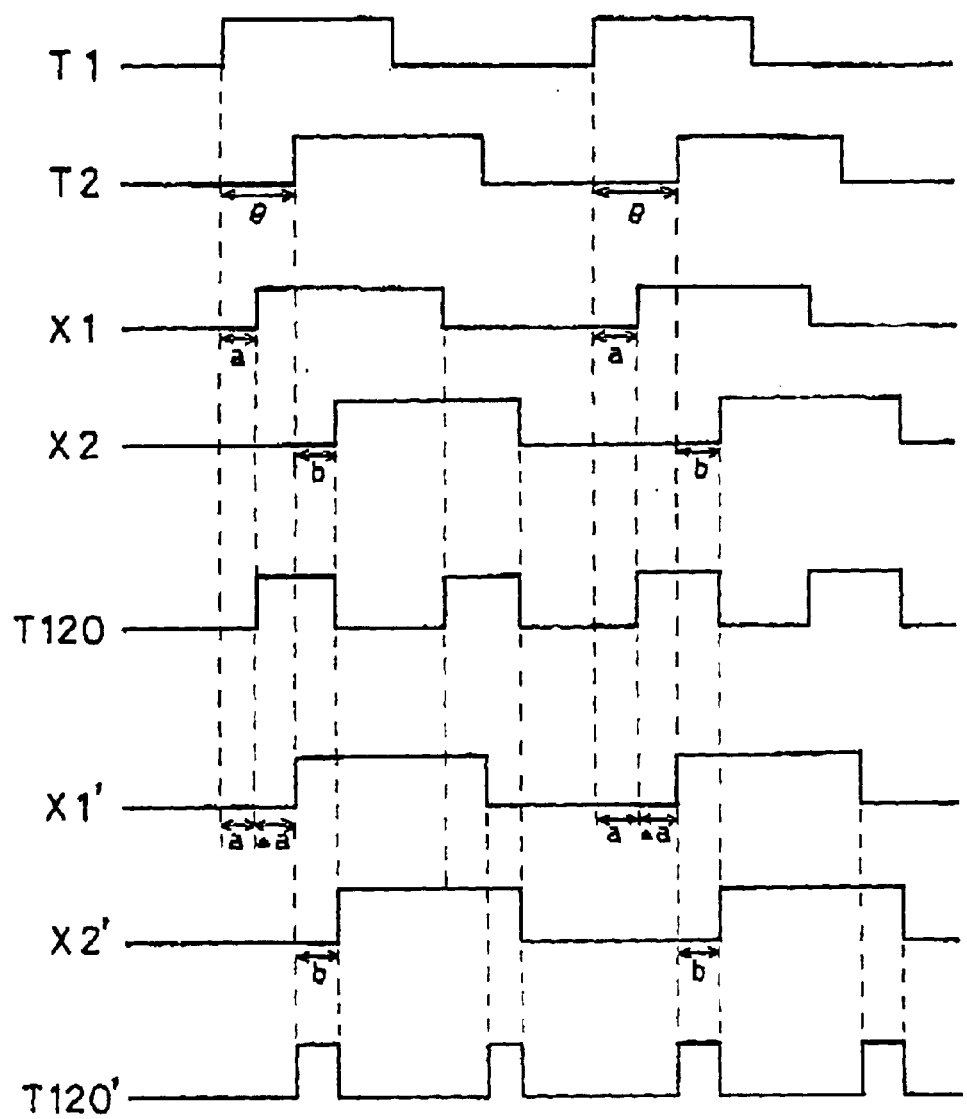
FIG. 11 is a view showing a waveform of a cyclic signal at each terminal and each node of the signal processing circuit shown in FIG. 10.

Reference is made herefome to the way of deriving the output signal Vx of the X-axis direction component, with reference to FIGS. 10 and 11. FIG. 10 is a circuit diagram (a part of FIG. 9) showing a signal processing circuit for components for the X-axis direction of the capacitance type sensor shown in FIG. 1. FIG. 11 is a view showing a waveform of a cyclic signal at each terminal and each node of the signal processing circuit shown in FIG. 10. Since the way of deriving the output signal Vy of the Y-axis direction component is the same as the way of deriving the output signal Vx of the X-axis direction component, the detailed explanation thereof is omitted.

In the signal processing circuit of FIG. 10, the capacitance element C1 and the resistance element R1, and the capacitance element C2 and the resistance element R2 form CR delay circuits, respectively. Accordingly, the cyclic signals (rectangular-wave signal) input to the terminals T1, T2 are delayed to a specific extent by the respective CR delay circuits and then are input to the EX-OR element 100.

In more detail, a cyclic signal f ($\phi$) (which corresponds to the cyclic signal A noted above) is input to the terminal T1, and a cyclic signal f ($\phi+\theta$) (which corresponds to the cyclic signal B noted above) identical in periodicity with but different in phase from the cyclic signal f ($\phi$) by $\theta$ only is input to the terminal T2. The cyclic signal f ($\phi$) input to the terminal T1 passes through the CR delay circuit formed by the capacitance element C1 and the resistance element R1 and reaches the node X1. This introduces a delay of time a in the cyclic signal at the node X1, as shown in FIG. 11. likewise, the cyclic signal f ($\phi+\theta$) input to the terminal T2 passes through the CR delay circuit formed by the capacitance element C2 and the resistance element R2 and reaches the node X2, This introduces a delay of time b in the cyclic signal at the node X2.

The cyclic signal f ($\phi$) and the cyclic signal f ($\phi+\theta$) of different in phase from f ($\phi$) which are input to the terminals T1 and T2 respectively are generated by dividing the cyclic signals output from a single cyclic signal oscillator two routes and introducing the phase lags in the cyclic signals passing through the CR delay circuit (not shown) arranged in one of the two routes. The way of introducing the phase lags in the cyclic signals is not limited to the way using the CR delay circuit. Any other adequate ways may be used. The cyclic signals f ($\phi$) and f ($\phi+\theta$) of different in phase from each other may be generated by using two cyclic signal oscillators and then input to the terminals T1 and T2, respectively.

The time a, b correspond to delay time in the CR delay circuit and are determined by their respective time constants of the CR delay circuit. Accordingly, if the resistance elements R1, R2 have the same resistance value, the time a, b will correspond to the capacitance value of the capacitance elements C1, C2. That is to say, with an increase in the capacitance value of the capacitance elements C1, C2, the value of the time a, b increases, and with a decrease in the capacitance value of the capacitance elements C1, C2, the value of the time a, b decreases.

Thus, the signals having the same waveform as the cyclic signals at the nodes X1, X2 are input to the EX-OR element 100, for an exclusive-OR logical operation between those signals and then the result is output to the terminal T120. It should be noted that the signal output to the terminal T120 is a rectangular-wave signal having a specified duty ratio (See FIG. 11).

Now, let us consider the waveform of the cyclic signals at the respective terminals and nodes appearing when the operating button 31 is operated in the X-axis positive direction (See FIG. 7). The capacitance elements formed between the capacitance element electrodes D1, D2 and the displacement electrode D0 of the signal processing circuit are taken here as C1', C2'. Also, the nodes and the terminals corresponding in position to the nodes X1, X2 and the terminal T120 of the signal processing circuit when the operating button 31 is not operated are taken here as X1', X2', and T120', respectively (See FIG. 10).

At this time, in the signal processing circuit of FIG. 10, the cyclic signal f ($\phi$) is input to the terminal T1 and the cyclic signal f ($\phi+\theta$) of identical in periodicity with but different in phase from f ($\phi$) by $\theta$ is input to the terminal T2, as is the case with the above. The cyclic signal f ($\phi$) input to the terminal T1 passes through the CR delay circuit formed by the capacitance element C1' and the resistance element R1 and reaches the node X1'. This introduces a delay of time a+$\Delta$a in the cyclic signal at the node X1', as shown in FIG. 11. This is because the time constant of the CR delay circuit is increased with the capacitance value of the capacitance element C1' becoming larger than that of the capacitance element C1. On the other hand, the cyclic signal f ($\phi+\theta$) input to the terminal T2 passes through the CR delay circuit formed by the capacitance element C2' and the resistance element R2 and reaches the node X2'. At this time, the cyclic signal at the node X2' has the same waveform as the cyclic signal at the node X2, since no force is applied to the operating button 31 in the X-axis negative direction.

Thus, the signals having the same waveform as the cyclic signals at the nodes X1', X2' are input to the EX-OR element 100, for an exclusive-OR logical operation between those signals and then the result is output to the terminal T120'. It should be noted that the signal output to the terminal T120' is a rectangular-wave signal having a specified duty ratio and when the operating button 31 is not operated, it is a rectangular-wave signal having a smaller duty ratio than the rectangular-wave signal output to the terminal T120, as shown in FIG. 11.

Practically, the signals to be output to the terminals T120 and T120' are output after they are smoothened by the low-pass filter 110, as mentioned above.

The capacitance type sensor 1 of the illustrated embodiment is intended for use as a force sensor and is preferably used as an input device (joystick) of a mobile phone, a personal digital assistant (PDA), a personal computer, a game, and the like. The capacitance type sensor 1 of the illustrated embodiment may be used as other sensors, such as an acceleration sensor, than the force sensor. In this case also, the same effect can be provided.

As seen from the foregoing, according to the capacitance type sensor 1 according to this embodiment, since the displacement of the operating button 31 is recognized by detecting variations of the capacitance values of the capacitance elements C1–C4 caused by the changes of the distances between the capacitance element electrodes D1–D4 and the displacement electrode D0, the magnitude of the force applied to the operating button 31 from outside can be recognized. Also, since the contact of the switching electrodes D31–D34 with the contact electrodes D11–D14 of the domed switches DS1–DS4 can be recognized, this can be used as the switching function. Accordingly, the capacitance type sensor 1 of this embodiment can be used as a device having the function of outputting the displacement of the operating button 31 (the magnitude of the force applied to the operating button 31 from outside) in the form of signal (analog signal) and also has the function as a device having the switch function. Thus, this capacitance type sensor 1 has the function as a composite device useable as either of the former device and the latter device, so that the need to re-create the sensor for either of the purposes mentioned above is eliminated.

Since the four domed switches DS1–DS4 and the capacitance elements C1–C4 comprising the displacement electrode D0 and the capacitance element electrodes D1–D4 are arranged in two layers with respect to a vertical direction in such a manner as to overlap with each other with respect to the displacement direction of the operating button 1. This can practically prevent the providing of the domed switches DS1–DS4 from reducing an effective area for the capacitance element electrodes D1–D4 or the displacement electrode D0. This can also provide a relatively small area required for placement of the electrodes included in the sensor. Thus, in the sensor of the present invention, reduction in sensitivity of the sensor and increase in size of the sensor can be suppressed by adding the switch function.

The capacitance type sensor 1 is produced by arranging the capacitance element electrodes D1–D4, the displacement electrode D0, the contact electrodes D11–D14, D21–D24, and the switching electrodes D31–D34 are formed on a single flexible FPC 11, first, and, then, folding the FPC 11 so that the capacitance element electrodes D1–D4 and the displacement electrode D0 can be opposite to each other. This can allow those electrodes to be set in proper place with ease and also can provide simplified production process of the sensor and thus reduced production costs.

Since the domed switches DS1–DS4 are disposed to be closer to the operating button 31 than the capacitance elements C1–C4, the state of the domed switches DS1–DS4 (ON-state or OFF state) can be switched easily before the distances between the capacitance element electrodes D1–D4 and the displacement electrode D0 which form the capacitance elements C1–C4 change, which is preferable when the switch function is given priority use.

Also, since the capacitance elements C1–C4 and the domed switches DS1–DS4 are arranged to correspond to the X-axis positive/negative directions and the Y-axis positive/negative directions, the capacitance type sensor can be used as a device having the function of recognizing a multidimensional force and/or a device having the switch function by using those to recognize forces for four different directions noted above.

Figure 12:
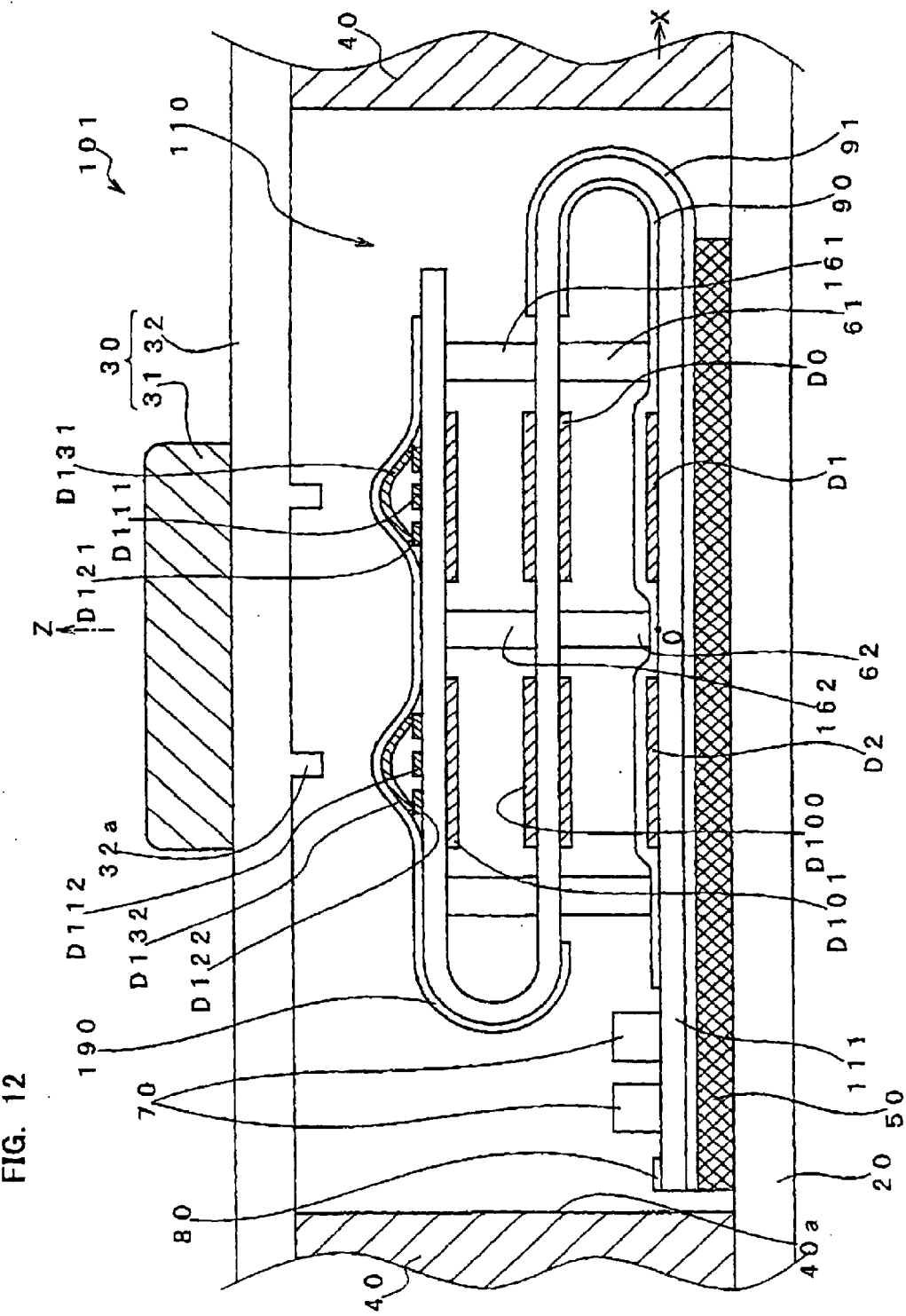
FIG. 12 is a schematic sectional view of a capacitance type sensor according to the second embodiment of the present invention.
Figure 13:
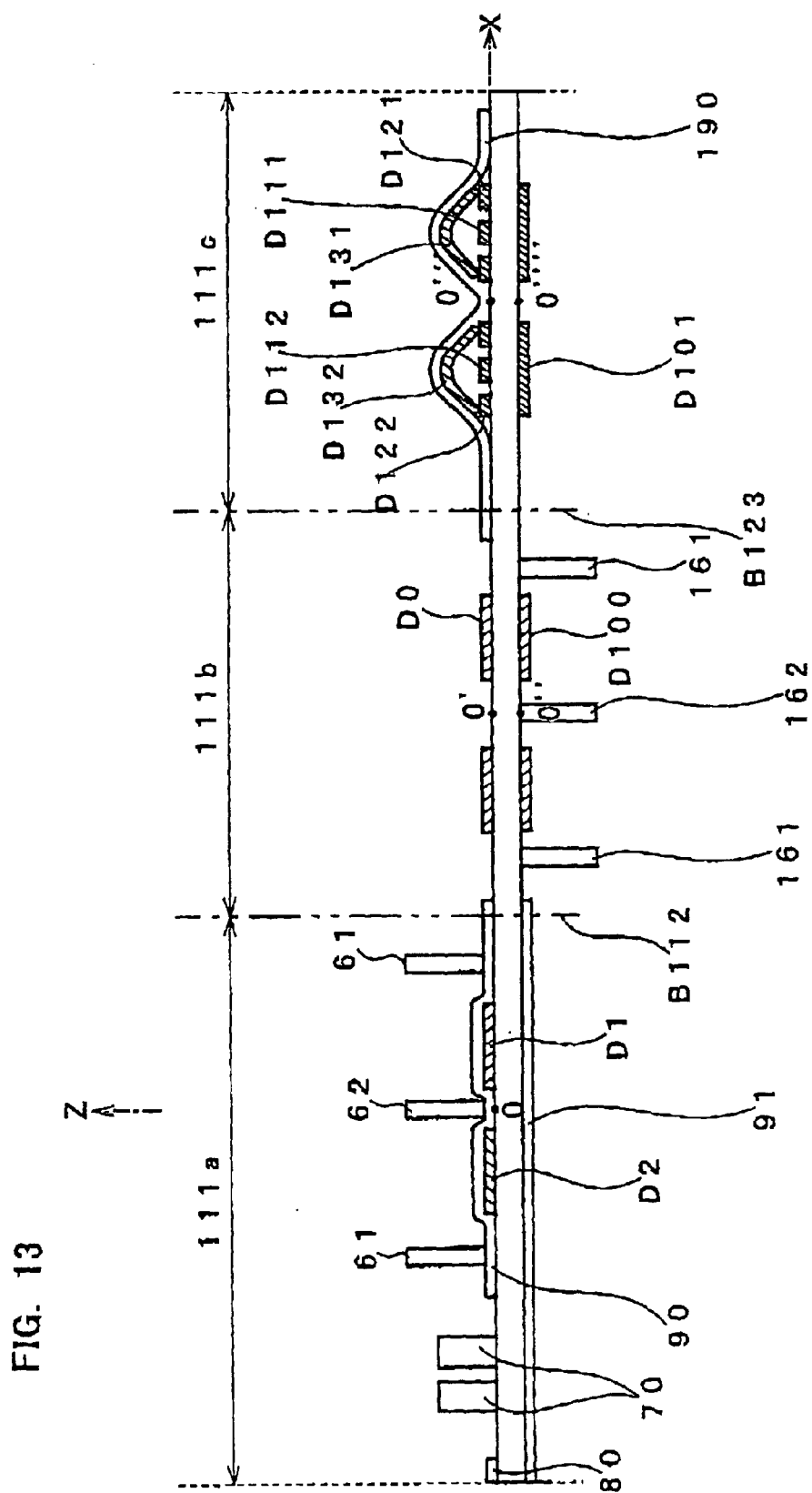
FIG. 13 is a sectional view showing an arrangement of a plurality of electrodes included in the capacitance type sensor of FIG. 12.
Figure 14:
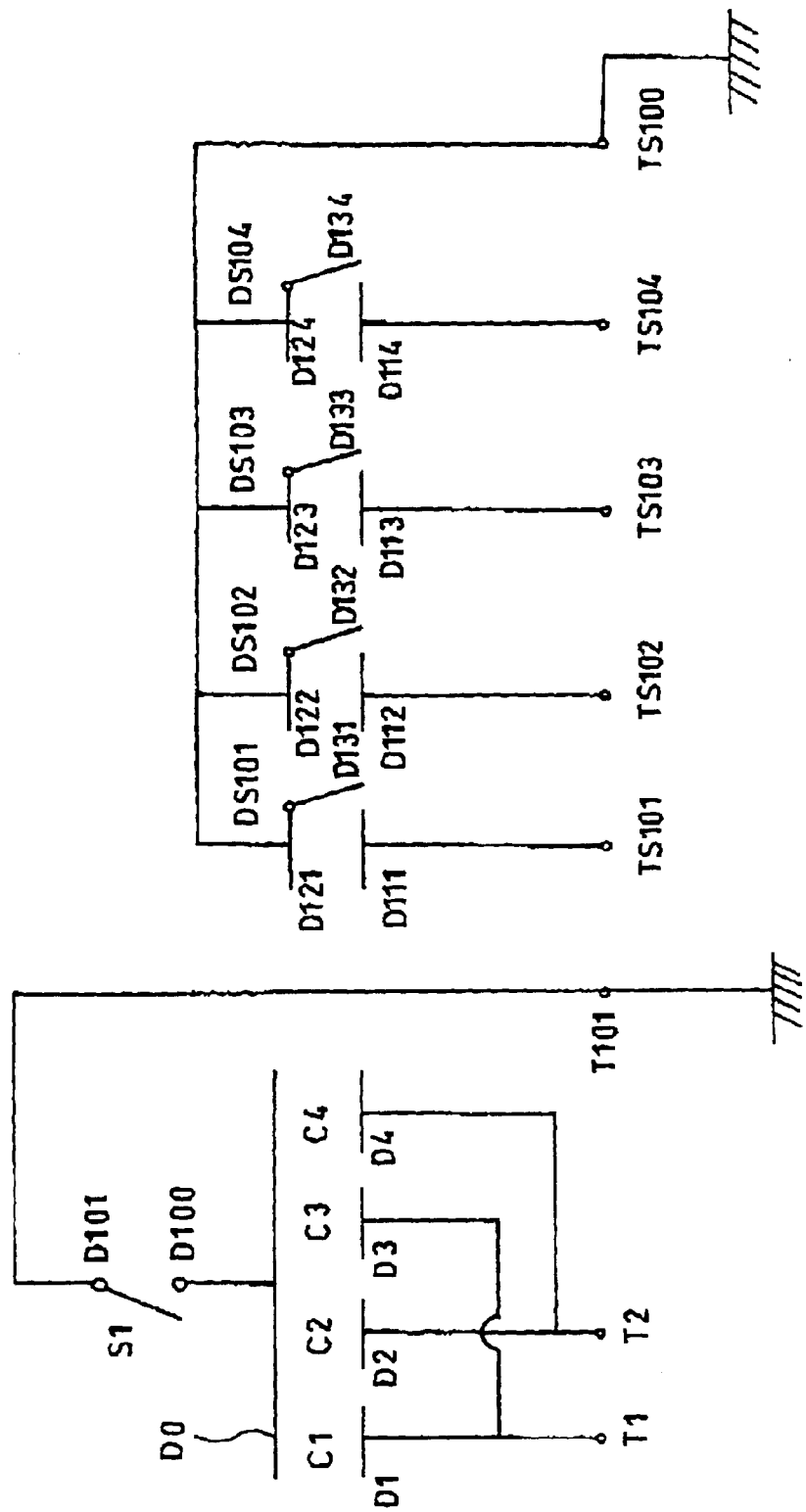
FIG. 14 is an equivalent circuit diagram for the construction of the capacitance type sensor shown in FIG. 12.

Next, the second embodiment of the present invention will be described with reference to FIGS. 12-14. FIG. 12 is a schematic sectional view of a capacitance type sensor according to the second embodiment of the present invention. FIG. 13 is a sectional view showing an arrangement of a plurality of electrodes included in the capacitance type sensor of FIG. 12. FIG. 14 is an equivalent circuit diagram for the construction of the capacitance type sensor shown in FIG. 12.

Now, the detailed structure of a capacitance type sensor 101 according to the second embodiment will be described with reference to FIGS. 12 and 13, The capacitance type sensor 101 of FIG. 12 differs from the capacitance type sensor 1 of FIG. 1 in that in the capacitance type sensor 1, the four capacitance elements C1–C4 and the four domed switches DS1–DS4 are arranged in two layers with respect to a vertical direction, whereas in the capacitance type sensor 101, the four capacitance elements C1–C4 and the four domed switches DS1–DS4 are arranged in three layers on the whole by adding a connecting switch S1 therebetween. As the remaining constructions are the same as those of the capacitance type sensor 1 of FIG. 1, the description thereon will be omitted, with like numerals given to like parts.

A sensor unit 110 incorporated in the capacitance type sensor 101 has a flexible FPC 111. The FPC 111 is divided into a first surface 111a, a second surface 111b, and a third surface 111c, as shown in FIG. 13. The first surface 111a and the second surface 111b are divided by a boundary line B112 indicated by a chain double-dashed line in FIG. 13. The second surface 111b and the third surface 111c are divided by a boundary line B123. The boundary lines B112 and B123 serves as folding lines along which the FPC 111 is folded.

As is the case with the first embodiment, the capacitance element electrodes D1–D4, the spacers 61, 62, the sensor circuit components 70, the connector terminal 80 and the resin sheets 90, 91 are arranged on the front surface (upper surface as viewed in FIG. 13) of the first surface 111a of the FPC 111, and the annular displacement electrode D0 with the point O' at the center is formed on the front surface of the second surface 111b.

An annular displacement electrode D100 with the point O" at the center is formed on the back surface of the second surface 111b. The displacement electrode D100 has the same shape as the displacement electrode D0 and is disposed to correspond to the displacement electrode D0. The displacement electrode Do and the displacement electrode D100 are electrically connected to each other via wiring not shown. An annular spacer 161 disposed around the outside of the displacement electrode D100 and a circular spacer 162 disposed inside of the spacer 161 are disposed on the back surface of the second surface 111b.

An annular displacement electrode D101 with the point O'''' at the center is formed on the back surface of the third surface 111c. The displacement electrode D101 has the same shape as the displacement electrode D0 (displacement electrode D100). As is the case with the first embodiment, four domed switches DS101–DS104 are arranged with the point O''' at the center on the front surface of the third surface 111c. The domed switches DS101–DS104 comprise contact electrodes D111–D114, D211–D214 and the switch electrodes D131–D134. A thin resin sheet (a cover layer) 190 is laid over the FPC 111 to cover it, while closely contacting with the entire upper surfaces of the four domed switches DS101–DS104.

In the manufacture of the sensor unit 110, after the respective electrodes are formed on the first surface 111a to the third surface 111c of the FPC 111, respectively, the second surface 111b and the third surface 111c are folded along the boundary line B112 between the first surface 111a and the second surface 111b so that the front surface of the first surface 111a and the front surface of the second surface 111b can be opposite to each other. Then, a region of the second surface 111b outside of the displacement electrode D0 on the second surface 111b is brought into contact with upper ends of the spacers 61, 62 disposed on the first surface 111a and is adhesive bonded thereto in that state.

Thereafter, the third surface 111c is folded along the boundary line B123 between the second surface 111b and the third surface 111c so that the back surface of the second surface 111a and the back surface of the third surface 111c can be opposite to each other. Then, a region of the third surface 111c outside of the displacement electrode D101 on the third surface 111c is brought into contact with upper ends of the spacers 161, 162 disposed on the second surface 111b and is adhesive bonded thereto in that state. After this manner, the sensor unit 110 shown in FIG. 12 is completed.

Thus, in the capacitance type sensor 101, the four capacitance elements C1–C4 which are arranged, between the capacitance element electrodes D1–D4 and the displacement electrode D0, to correspond to the X-axis positive direction, the X-axis negative direction, the Y-axis positive direction and the Y-axis negative direction, respectively, the connecting switch S1, and the four domed switches DS101–DS104 corresponding to the above-mentioned four directions, respectively, are arranged in three layers with respect to a vertical direction (displacement direction of the operating button 31).

In the sensor circuit of this embodiment, the displacement electrode D0 is constructed so that it can take either the grounded state or the non-grounded (insulated) state by switching the connecting switch S1 to either the ON-state or the OFF-state, as shown in FIG. 14. The capacitance element electrodes D1–D4 are connected to the terminals T1, T2. The displacement electrode D0 and the displacement electrode D100 are electrically connected to each other, and the displacement electrode D101 is connected to ground through the terminal T101.

When the connecting switch S1 is in the ON-state, the displacement electrode D0 is put in the grounded state, so that electrical charges are stored in the capacitance elements C1–C4. As a result of this, the force sensor circuit of the capacitance type sensor 101 can function to output analog voltage corresponding to direction and magnitude of a force applied to the operating button 31. On the other hand, when the connecting switch S1 is in the OFF-state, the displacement electrode D0 is put in the non-grounded (insulated) state. As a result of this, the electrical charges are not stored in the capacitance elements C1–C4, so that the force sensor circuit of the capacitance type sensor 101 fails.

Although stray capacitance exists around the capacitance element electrodes D1–D4, the displacement electrodes D0, D100, D101 and the circuit pattern practically, since it is so small that it may be ignored, as compared with the original capacitance values of the capacitance elements C1–C4, the stray capacitance is ignored in the description.

As is the case with the first embodiment, independent of the force sensor circuit, including the capacitance elements C1–C4, for detecting the force applied to the operating part 30, the switch circuit including four domed switches DS101–DS104 is constructed. Accordingly, the each other's operation does not exert any electric influence on the other. Therefore, the output of the force sensor circuit and the output of the switch circuit can be selectively used in accordance with use conditions of equipment on which the capacitance type sensor 101 is mounted. The contact electrodes D111–D114 are connected to terminals TS101–TS104, respectively. The contact electrodes D121–D124 are all connected to a terminal TS100 and are connected to ground through the terminal TS100.

When the operating button 31 is operated in the X-axis positive direction in the capacitance type sensor 101, the portion of the operating button 31 corresponding to the X-axis positive direction is pressed down, so that the keypad base 32 are elastically deformed and, as a result, the protrusion 32a of the keypad base 32 corresponding to the X-axis positive direction is displaced downwardly. This brings the front end portion of the protrusion 32a into contact with the resin sheet 190 laid on the third surface 111c of the FPC 111.

Then, when the portion of the operating button 31 corresponding to the X-axis positive direction is pressed down further, a downward force is applied to a nearly top portion of the switching electrode D131 of the domed switch DS101. When the force does not reach a specified value, the switching electrode D131 is not displaced virtually. On the other hand, when the force reaches the specified value, the switching electrode D131 is elastically deformed and depressed drastically with buckling at the nearly top portion thereof and is brought into contact with the contact electrode D111. This brings the domed switch DS101 into the ON-state. At this time, the operator is given a pronounced tactile feel.

Thereafter, when the portion of the operating button 31 corresponding to the X-axis positive direction is pressed down further, the FPC 111 is elastically deformed, while the domed switch DS101 is kept in the on-state, so that the portion of the displacement electrode D101 corresponding to the X-axis positive direction is displaced downwardly. Then, when the portion of the displacement electrode D101 proximate to the portion concerned is pressed down to an extent corresponding to a specified height, it is brought into contact with the displacement electrode D100. As a result, the connecting switch S1 is switched from the off-state to the on-state.

Thereafter, when the portion of the operating button 31 corresponding to the X-axis positive direction is pressed down further, the FPC 111 is elastically deformed, while the connecting switch S1 is kept in the on-state, so that the displacement electrode D0 is displaced downwardly. As a result, the distance between the displacement electrode D0 and the capacitance element electrode D1 is decreased.

When the force applied to the operating button 31 is removed, the displacement electrodes D0, D100, D101 are returned to their original positions by the elasticity of the FPC 111, so that the capacitance type sensor 101 is returned to the state before operation.

It is to be noted here that in this embodiment, the capacitance values of the capacitance elements C1–C4 are so small that they may be ignored before operation of the operating button 31 and after operation of the same, while however, during the operation of the operating button 31, the displacement electrode D100 and the displacement electrode D101 are in contact with each other (the connecting switch S1 is in the on-state) so that the capacitance elements C1–C4 can be electrically charged and discharged. Accordingly, in the case where the displacement electrode D100 and the displacement electrode D101 are not contacted with each other and the displacement electrode D0 is not connected to ground before operation of the operating button 31 and after operation of the same, even when the displacement electrodes D0, D100, D101 are changed in position before and after the operation, changes of the capacitance values of the capacitance elements C1–C4 at that time are still negligible. In other words, even in the case where the FPC 111 is not returned to its original position instantaneously or permanently due to the creep when deformed or displaced, as long as contact or isolation between the displacement electrode D100 and the displacement electrode D101 can be ensured, hysteresis of the capacitance type sensor 101 can be reduced to provide improved reproducibility.

As seen from the foregoing, the capacitance type sensor 101 according to this embodiment can provide substantially the same effect as the first embodiment.

Figure 15:
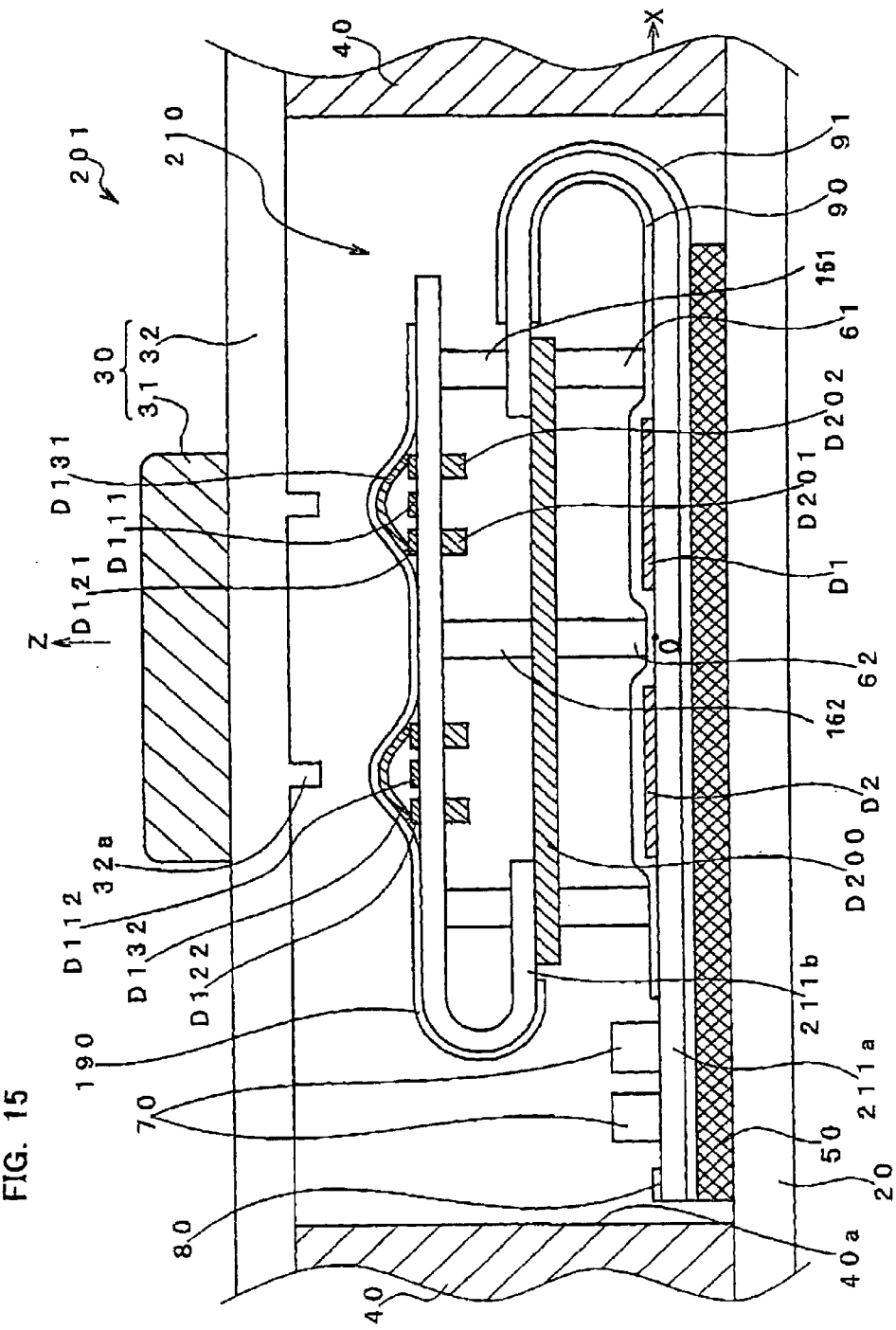
FIG. 15 is a schematic sectional view of a capacitance type sensor according to a variant of the second embodiment of the present invention.
Figure 16:
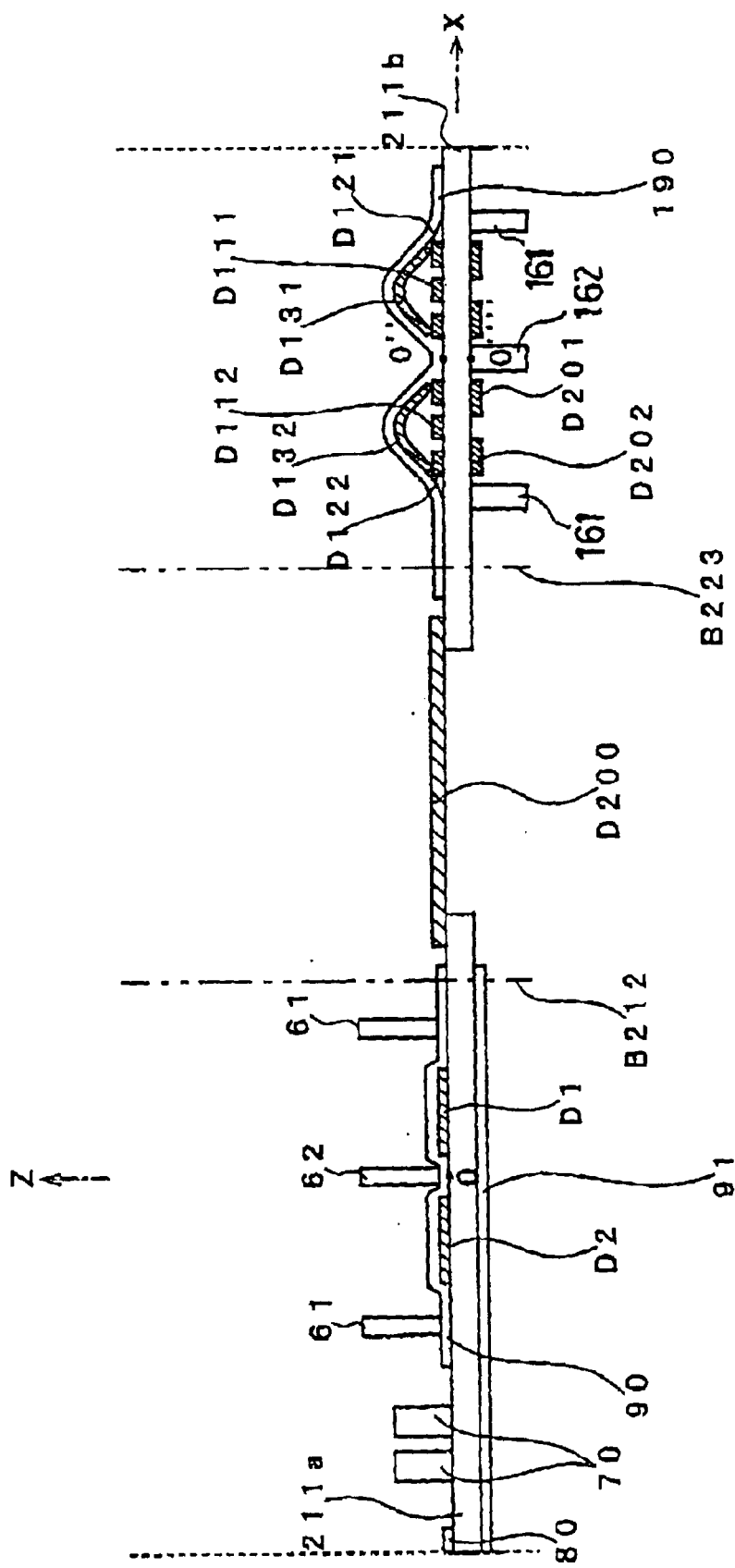
FIG. 16 is a sectional view showing an arrangement of a plurality of electrodes included in the capacitance type sensor of FIG. 15.
Figure 17:
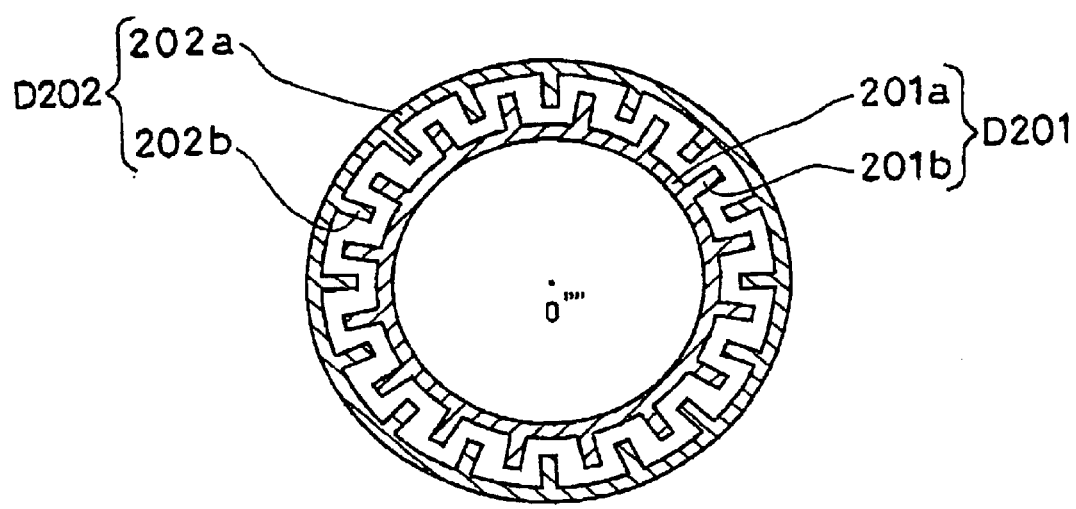
FIG. 17 is a view showing a rough configuration of a land included in the capacitance type sensor of FIG. 15.
Figure 18:
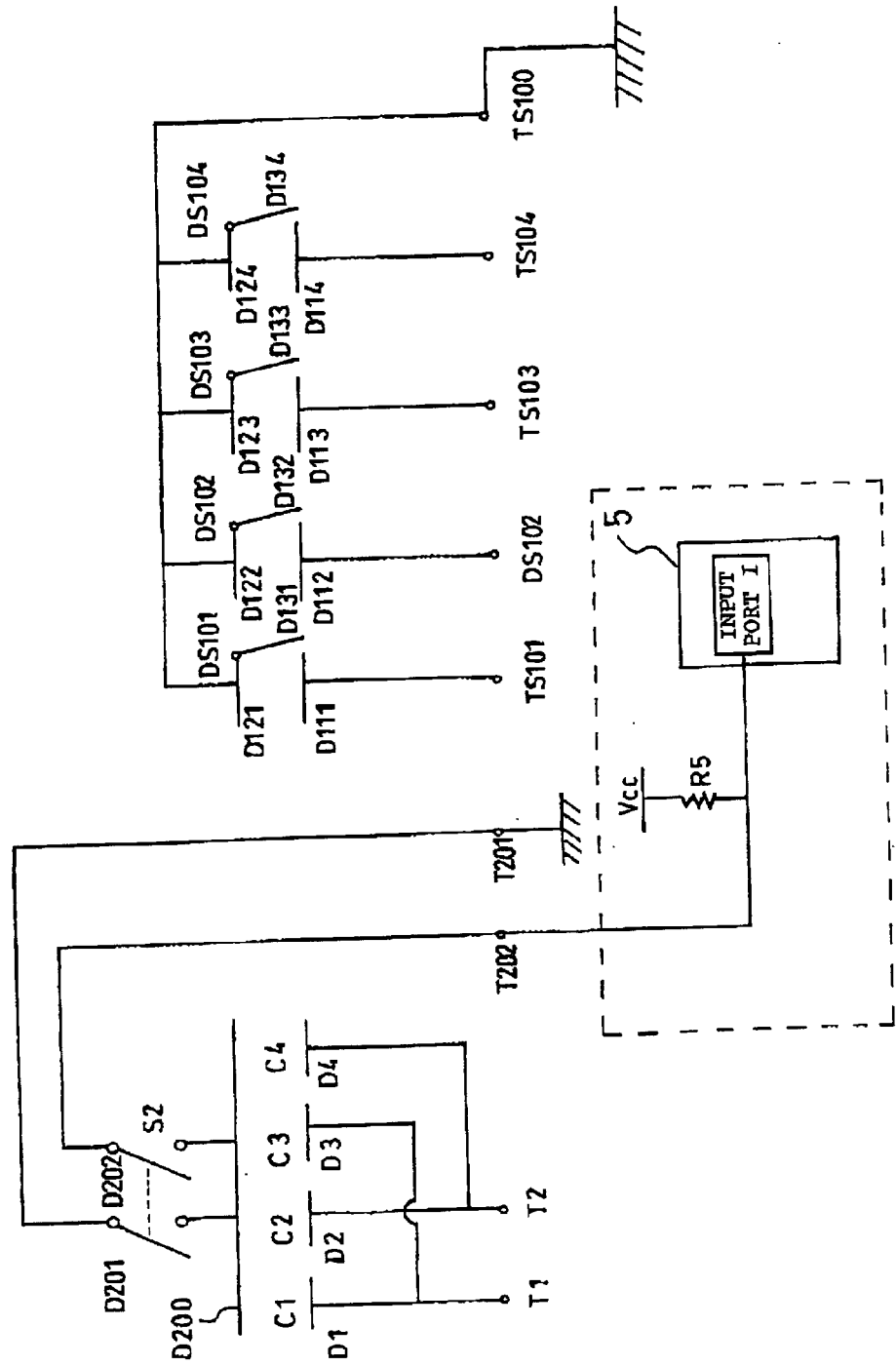
FIG. 18 is an equivalent circuit diagram for the construction of the capacitance type sensor shown in FIG. 15.

Next, a variant of the second embodiment of the present invention will be described with reference to FIGS. 15-19. FIG. 15 is a schematic sectional view of a capacitance type sensor according to a variant of the second embodiment of the present invention. FIG. 16 is a sectional view showing an arrangement of a plurality of electrodes included in the capacitance type sensor of FIG. 15. FIG. 17 is a view showing a rough configuration of a land included in the capacitance type sensor of FIG. 15. FIG. 18 is an equivalent circuit diagram for the construction of the capacitance type sensor shown in FIG. 15.

Now, the detailed structure of a capacitance type sensor 201 according to the variant of the second embodiment will be described with reference to FIGS. 15 and 16. The capacitance type sensor 201 of FIG. 15 differs from the capacitance type sensor 101 of FIG. 12 in that in the capacitance type sensor 101, the displacement electrode DO forming the capacitance elements C1–C4 is formed of conductive ink and the connecting switch S1 is formed by two displacement electrodes D100, D101, whereas in the capacitance type sensor 201, the displacement electrode D200 forming the capacitance elements C1–C4 is formed of a metal plate and the wakeup switch S2 is formed by the displacement electrode D200 and two lands D201, D202. As the remaining constructions are the same as those of the capacitance type sensor 101 of FIG. 12, the description thereon will be omitted, with like numerals given to like parts.

A sensor unit 210 incorporated in the capacitance type sensor 201 has flexible FPCs 211a, 211b, and the displacement electrode D200 of a thin metal plate-like member having flexibility. The FPCs 211a, 211b are connected to each other through the displacement electrode D200, as shown in FIG. 16. The FPCs are divided at portions thereof proximity of the joint between the FPC 211a and the displacement electrode D200 and the joint between the FPC 211b and the displacement electrode D200 by boundary lines B212, B223 indicated by chain double-dashed lines in FIG. 16. The boundary lines B212 and B223 serve as folding lines along which the FPCs 211a, 211b are folded.

The lands D201, D202 having the function of switch contact points are formed on the back surface of the FPC 211b. The land D201 is formed into a generally annular shape with the point $O^{9350}$ at the center, as shown in FIG. 17. The land D202 is formed into a generally annular shape and located around the outside of the land D201. The land D201 has a circumference portion 201a and a plurality of protrusions 201b protruding outwardly from the circumference portion 201a. The land D202 has a circumference portion 202a and a plurality of protrusions 202b protruding inwardly from the circumference portion 202a. The lands D201, D202 are arranged to correspond to the domed switches DS101–DS104 so that when the domed switches DS101–DS104 are pressed, the lands D201, D202 can be displaced easily.

The circumference portion 201a and the circumference portion 202a each have the same width along the circumference. Also, the protrusions 201b and 202b each have substantially the same width as the width of the circumferences 201a and 202a and each have a generally rectangular form having a length shorter than an interval at which the circumference portion 201a and the circumference portion 202a are spaced from each other. The protrusions 201b and the protrusions 202b are arrayed alternately along the circumference. The land D201 has an outer periphery formed in a pectinated form, and the land D202 has an inner periphery formed in a pectinated form. The protrusions 201b and 202b may be modified in number and shape arbitrarily. Preferably, the both protrusions are arrayed leaving little space therebetween to an extent possible to which the both are not contacted with each other. The lands D201, D202 need not be necessarily formed in a pectinated form. The lands may be changed to any form as can detect the contact with the displacement electrode D200.

As is the case with the second embodiment, the FPCs 211a, 211b are folded along the boundary lines B212, B223, to complete the sensor it 210 as shown in FIG. 15.

This produces, as is the case with the capacitance type sensor 101, the capacitance type sensor 201 in which four capacitance elements C1–C4 arranged between the capacitance element electrodes D1–D4 and the displacement electrode D200 to correspond to the X-axis positive direction, the X-axis negative direction, the Y-axis positive direction and the Y-axis negative direction, respectively, the wakeup switch S2, and the domed switches DS101–DS104 corresponding to the four directions mentioned above are arranged in three layers with respect to a vertical direction (displacement direction of the operating button 31).

The displacement electrode D200 may be formed of other conductive material, such as conductive plastics, than the metal plate. Also, the FPC 211a and the FPC 211b may be formed into a single FPC so that the conductive lands may be formed on both surfaces of that single FPC at positions thereof corresponding to the displacement electrode D200. In the case where the displacement electrode formed of a single metal plate is used in the second embodiment, instead of the displacement electrodes D100, D1101 formed on the both sides of the FPC 111, such a displacement electrode is elastically deformed with ease. Accordingly, this modification is further preferable in terms of reduction in hysteresis of sensor output and durability of the sensor.

In the sensor circuit of this embodiment, as shown in FIG. 18, the wakeup switch S2 is formed between the displacement electrode D200 and the lands D201, D202. In other words, the wakeup switch S2 can take either the contact state (ON-state) in which the displacement electrode D200 is contacted with the lands D201, D202 and the non-contact state (OFF-state) in which the displacement electrode D200 is contacted with the lands D201, D202. The land D201 is connected to ground through the terminal T201 and the land D202 is held at power-supply voltage Vcc having a certain voltage through the terminal T202 and a pull-up resistance element R5. Also, the land D202 is connected to an input port I of the microcomputer 5 of an external circuit through the terminal T202.

When the operating button 31 is not operated, the displacement electrode D200 and the lands D201, D202 are not in contact with each other and thus the wakeup switch S2 is in the off-state. At this time, since the land D202 is pulled up, the input port I of the microcomputer 5 connected to the land D202 is held at the power-supply voltage Vcc, so that the input gets "Hi" digitally. Also, at this time, the displacement electrode D200 is in the non-grounded state (insulated state).

On the other hand, when the operating button 31 is operated (or when the capacitance values of the capacitance elements C1–C4 change), the displacement electrode D200 is put into contact with the lands D201, D202. As a result, the lands D201, D202 are short-circuited through the displacement electrode D200, so that the wakeup switch S2 is put into the on-state. At this time, the input port I of the microcomputer 5 comes to have a value corresponding to the ground voltage, so that the input gets "Lo" digitally.

When the wakeup switch S2 is in the ON-state, the displacement electrode D200 is put in the grounded state, so that electrical charges are stored in the capacitance elements C1–C4. As a result of this, the force sensor circuit of the capacitance type sensor 201 can function to output analog voltage corresponding to direction and magnitude of a force applied to the operating button 31. On the other hand, when the wakeup switch S2 is in the OFF-state, the displacement electrode D200 is put in the non-grounded (insulated) state. As a result of this, the electrical charges are not stored in the capacitance elements C1–C4, so that the force sensor circuit of the capacitance type sensor 201 fails.

When the operating button 31 is operated in the X-axis positive direction in the capacitance type sensor 201, the portion of the operating button 31 corresponding to the X-axis positive direction is pressed down, so that the keypad base 32 are elastically deformed and, as a result, the protrusion 32a of the keypad base 32 corresponding to the X-axis positive direction is displaced downwardly. This brings the front end portion of the protrusion 32a into contact with the resin sheet 190 laid on the FPC 211b.

Then, when the portion of the operating button 31 corresponding to the X-axis positive direction is pressed down further, a downward force is applied to a nearly top portion of the switching electrode D131 of the domed switch DS101. When the force does not reach a specified value, the switching electrode D131 is not displaced virtually. On the other hand, when the force reaches the specified value, the switching electrode D131 is elastically deformed and depressed drastically with buckling at the nearly top portion thereof and is brought into contact with the contact electrode D111. This brings the domed switch DS101 into the ON-state. At this time, the operator is given a pronounced tactile feel.

Thereafter, when the portion of the operating button 31 corresponding to the X-axis positive direction is pressed down further, the FPC 111 is elastically deformed, while the domed switch DS101 is kept in the on-state, so that the lands D201, D202 are pressed down. Then, when the portions of the lands D201, D202 are pressed down to an extent corresponding to a specified height, the lands D201, D202 are brought into contact with the displacement electrode D200. As a result, the wakeup switch S2 is switched from the off-state to the on-state.

Thereafter, when the portion of the operating button 31 corresponding to the X-axis positive direction is pressed down further, the FPC 111 is elastically deformed, while the wakeup switch S2 is kept in the on-state, so that the displacement electrode D200 is displaced downwardly. As a result, the distance between the displacement electrode D200 and the capacitance element electrode D1 is decreased.

When the force applied to the operating button 31 is removed, the displacement electrodes D200, D201, D102 are returned to their original positions by the elasticity of the FPC 111, so that the capacitance type sensor 201 is returned to the state before operation.

As mentioned above, in the capacitance type sensor 201 of this embodiment, since the operation applied to the sensor can be reliably detected by monitoring the output from the input port I of the microcomputer 5, the sleep mode can be reliably cancelled. This can provide the result that in the capacitance type sensor 201 as well, when the operating button 31 is not operated for many hours, the power consumption can be cut by switching the capacitance type sensor to the sleep mode.

When the capacitance type sensor 201 is used with a microcomputer control system, the capacitance type sensor 201 can select either a force-detecting mode in which a force applied to the operating button 31 is detected (hereinafter it is referred to as "normal mode") or a power-saving mode in which power consumption is reduced as much as possible (hereinafter it is referred to as "sleep mode"). When the operating button 31 in the normal mode is not operated after passage of a specified time, the normal mode is automatically switched to the sleep mode. On the other hand, when the operating button 31 is operated in the sleep mode, the sleep mode is cancelled and switched to the normal mode automatically.

In the normal mode, the cyclic signals are input to the terminals T1, T2 connected to the capacitance element electrodes D1–D4, as mentioned above. By using the cyclic signals, the capacitance values of the capacitance elements C1–C4 formed between the displacement electrode D0 and the capacitance element electrodes D1–D4 are detected and thereby the direction and magnitude of the force applied to the operating button 31 is detected.

On the other hand, in the sleep mode, the cyclic signals are not input to the terminals T1, T2 connected to the capacitance element electrodes D1–D4. Accordingly, in the non-operating mode idle mode) in which the operating button 31 is not operated, wasteful power consumption is cut.

The microcomputer 5 of the external circuit to which the land D202 is connected is provided with a timer (not shown) to measure the elapsed time from the end of the last operation of the operating button 31 in the normal mode. When the operating button 31 is not operated in the normal mode, the time specified time) for the sensor to be automatically switched to the sleep mode is preset.

Figure 19:
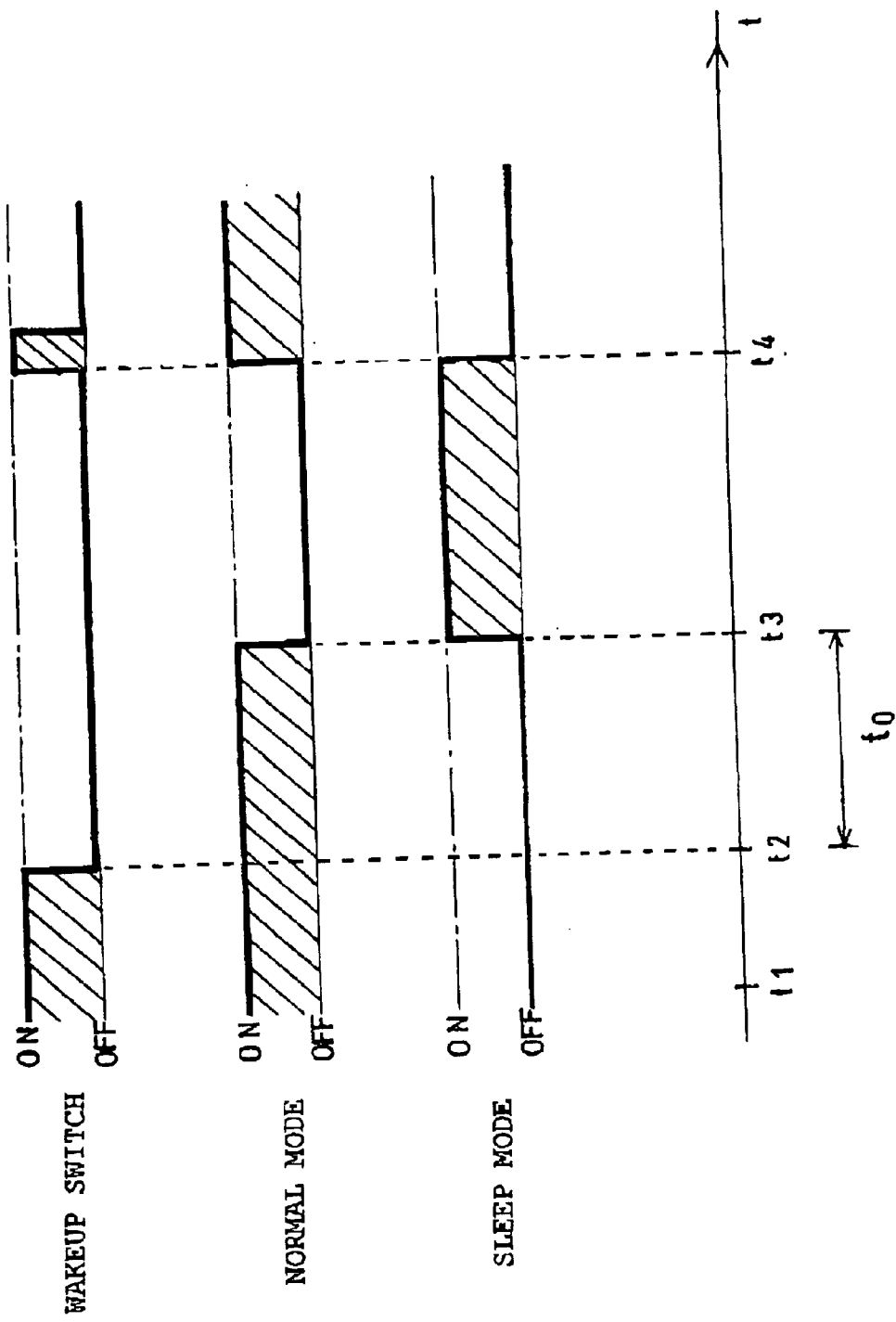
FIG. 19 is an illustration for explaining the way of switching the mode of the capacitance type sensor shown in FIG. 15.

Now, the mode selection of the capacitance type sensor 201 is described with reference to FIG. 19. FIG. 19 is an illustration for explaining the mode selection of the capacitance type sensor shown in FIG. 15. In FIG. 19, the states (on-state r off-state) of the normal mode, the sleep mode and the wakeup switch with respect to the time passage are illustrated in a correlative manner.

First, let us consider that the operating button 31 is already operated at the time t1 of FIG. 19. At this time at which the operating button 31 is already operated, the wakeup switch S2 is in the on-state and also the capacitance type sensor 201 is in the normal mode (the normal mode is in the on-state and the sleep mode is in the off-state).

During the time period from t1 to t2 in FIG. 19, the operation of the operating button 31 is kept on. At the time t2 at which the operation of the operating button 31 is stopped, the wakeup switch S2 is switched from the on-state to the off-state, At substantially the same time as this, the operation of the timer of the microcomputer 5 starts.

During the time period from t2 at which the operation of the operating button 31 is stopped to t3, during which time passes by a specified time t0 only, the non-operation state of the operating button 31 is kept in the normal mode. In this embodiment, the capacitance type sensor 201 is set so that it is automatically switched from the normal mode to the sleep mode when the non-operation state of the operating button 31 is kept in the normal mode by the specified time of t0 only.

Accordingly, when the time arrives at t3 in FIG. 19, the capacitance type sensor 201 is switched from the normal mode to the sleep mode. In other words, the normal mode is switched from the on-state to the off-state and the sleep mod is switched from the off-state to the on-state. Then, the sleep mode is kept in the on-state until the operating button 31 is re-operated.

Thereafter, when the operating button 31 is re-operated at the time t4 in FIG. 19, the wakeup switch S2 is switched from the off-state to the on-state and, at substantially the same time as this, the capacitance type sensor 201 is switched from the sleep mode to the normal mode. In other words, the sleep mode is switched from the on-state to the off-state and also the normal mode is switched from the off-state to the on-state.

When the wakeup switch S2 is switched from the off-state to the on-state, the voltage of the land D202 surely varies across the threshold voltage about half of the power-supply voltage. Therefore, the operation of the operating button 31 can be surely detected in the microcomputer 5 by simply monitoring the changes of voltage of the input port I connected to the land D202.

The timer of the microcomputer 5 is stopped and reset at the time when the operating button 31 is operated again. Then, when the restarted operation of the operating button 31 is stopped at the time t4 in FIG. 19, the operation of the timer is started.

While in this variant, the contact output of the land D201 is used as the wakeup switch for canceling the sleep mode, it may be used as a different switch than the wakeup switch.

As mentioned above, the capacitance type sensor 202 according to the variant can provide the substantially the same effect as the second embodiment.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

Figure 20:
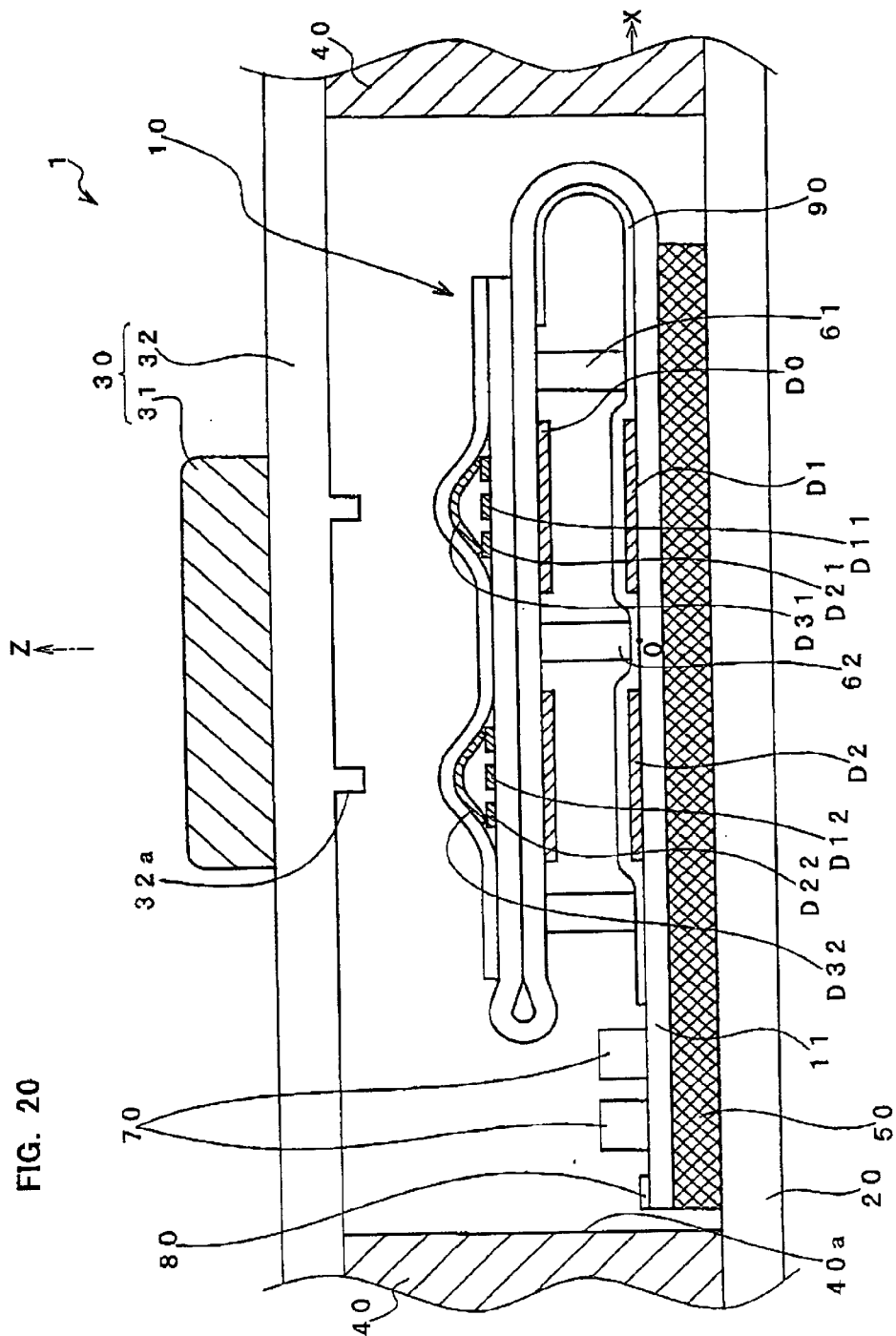
FIG. 20 is a schematic sectional view of a capacitance type sensor according to a variant of the first embodiment of the present invention.
Figure 21:
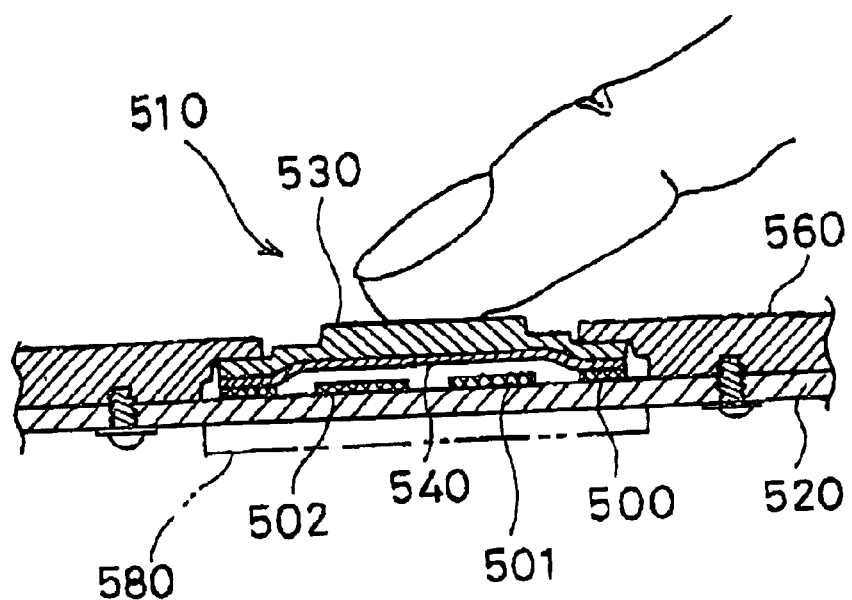
FIG. 21 is a schematic sectional view of a conventional capacitance type sensor.
Figure 22:
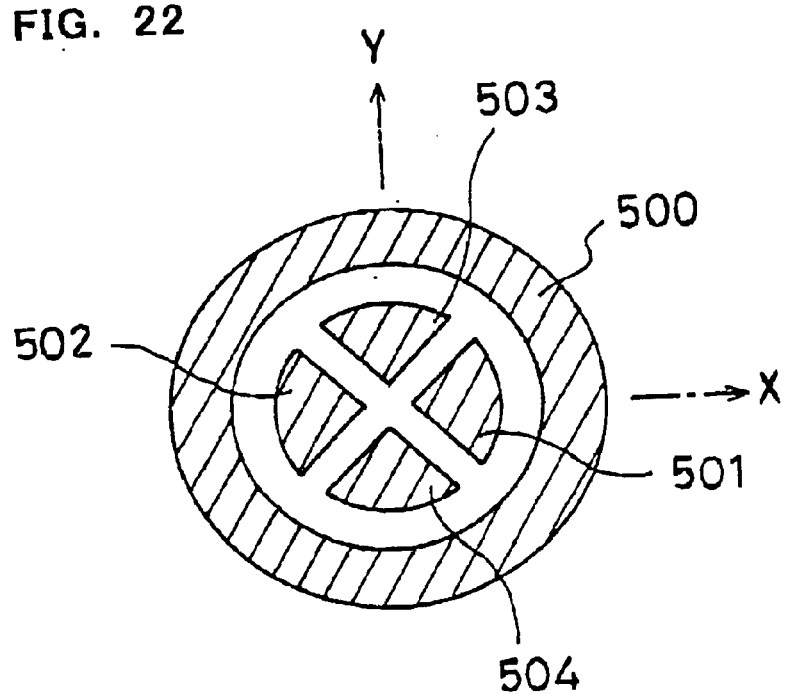
FIG. 22 is a view showing an arrangement of a plurality of electrodes formed on a substrate of the capacitance type sensor of FIG. 21.

Although the sensor unit having a plurality of electrodes formed on the single FPC has been illustrated in the first and second embodiments described above, this construction is not limitative. The construction of the sensor unit may be modified arbitrarily. The electrodes need not necessarily be formed on the substrate. Even when the electrodes are formed on the substrate, all of them need not necessarily be formed on the single substrate. While in the first embodiment, the sensor unit is folded after the respective electrodes are arranged on the both sides of the FPC, it may be folded after the respective electrodes are arranged on the single side of the FPC, as shown in FIG. 20. The substrate may be other substrate of no flexibility (rigidity) than the FPC or may be FPC on which a reinforcing plate made of e.g. resin or metal is mounted to provide improved rigidity.

Although the sensor unit in which the capacitance elements and the one or two switches (domed switch, connecting switch or wakeup switch) are arranged in two or three layers with respect to a vertical direction have been illustrated in the first and second embodiments described above, this is not limitative. The sensor unit may have the capacitance elements and three or more switches arranged in four or more layers.

Although the sensor units multilayered in such a relation that the capacitance elements are arranged in the undermost layer and the switches are arranged to be closer to the operating button than the capacitance elements have been illustrated in the first and second embodiments described above, this is not limitative. The capacitance elements need not necessarily be arranged in the undermost layer. The capacitance elements and the switches may be placed in opposite arrangement. That is to say, the switches may be arranged in the undermost layer and the capacitance elements may be arranged to be closer to the operating button than the switches.

Although the operation applied to the operating button that is performed in the order that after the domed switch is switched from the off-state to the on-state, the capacitance values of the capacitance elements are varied has been illustrated in the first embodiment described above, the operating order may be changed. That is to say, the operation may be performed in such an order that after the capacitance values of the capacitance elements are varied, the domed switch is switched from the off-state to the on-state or that at substantially the same time as the domed switch is switched from the off-state to the on-state, the capacitance values of the capacitance elements are varied. Also, these operation orders may be changed properly by adjusting strength (rigidity) of the FPC, the switching electrodes, etc.

Likewise, in the second embodiment, the timing of the domed switch being switched from the off-state to the on-state, the timing of the connecting switch or the wakeup switch being switched from the off-state to the on-state, and the timing of the capacitance values of the capacitance elements being varied may be made inconsecutive or may be made substantially simultaneous. However, as for the timing of the connecting switch or the wakeup switch being switched from the off-state to the on-state and the timing of the capacitance values of the capacitance elements being varied, it is preferable that after the connecting switch or the wakeup switch is switched from the off-state to the on-state, the capacitance value of the capacitance elements are varied.

Although the arrangement wherein the FPC is provided with the connector terminals used as an interface with external has been illustrated in the first and second embodiments, this is not Limitative. The FPC may alternatively be provided with a soldering land.

Although the arrangement wherein two lands are formed on the FPC has been illustrated in the second embodiment, this is not limitative. The lands on the FPC may be changed in number and shape arbitrarily.

Although the capacitance type sensor capable of detecting two component of a force applied from outside for the X-axis direction and the Y-axis direction has been illustrated in the first and second embodiments described above, this is not limitative. The capacitance type sensor of the invention may have the capability of detecting only a required component of the two components of the force mentioned above.

What is claimed is:

1. A capacitance type sensor comprising:
   a detective member,
   a first electrode being opposite to the detective member,
   a second electrode arranged between the detective member and the rst electrode and constituting capacitance elements with the first electrode, the second electrode being displaceable in a same direction as the detective member when the detective member is displaced, one or more first switching electrodes being opposite to the detective member, and one or more second switching electrodes arranged between the detective member and the first switching electrode(s) in such a relation as to be opposite to the first switching electrode(s) and also spaced apart from the first switching electrode(s), the second switching electrodes being contactable with the first switching electrode(s) increasingly with displacement of the detective member, wherein the first and second switching electrodes are arranged to overlap with the first and second electrodes with respect to a displacement direction of the detecting member, and wherein the capacitance type sensor is capable of recognizing the displacement of the detective member on the basis of a detection, using a signal inpput to the first electrode, of a change in capacitance value of the capacitance element caused by a change in distance between the first electrode and the second electrode.

2. The capacitance type sensor according to claim 1, which further comprises:

a first substrate disposed on the side opposite to the second electrode with respect to the first electrode and having the first electrode on its surface, a second substrate disposed on the side opposite to the first electrode with respect to the second electrode and having the second electrode on its surface, a first switching substrate disposed on the side opposite to the second switching electrode(s) with respect to the first switching electrode(s) and having the first switching electrode(s) on its surface, and a second switching substrate disposed on the side opposite to the first switching electode(s) with respect to the second switching electrode(s) and having the second switching electrode(s) on its surface.

3. The capacitance type sensor according to claim 1, wherein the first substrate, the second substrate, the first switching substrate and the second switching substrate are formed by a single common substrate having flexibility.

4. The capacitance type sensor according to claim 3, wherein the first electrode, the second electrode, the first switching electrode, and the second switching electrode are all arranged on one side of the common substrate.

5. The capacitance type sensor according to claim 1, wherein the first and second switching electrodes are disposed to be closer to the detective member than the first and second electrodes.

6. The capacitance type sensor according to claim 1, wherein there are provided two or more groups of the first and second electrodes or two or more groups of the first and second switching electrode.

7. The capacitance type sensor according to claim 2, wherein the first substrate, the second substrate, the first switching substrate and the second switching substrate are formed by a single common substrate having flexibility.

8. The capacitance type sensor according to claim 2, wherein the first and second switching electrodes are disposed to be closer to the detective member than the first and second electrodes.

9. The capacitance type sensor according to claim 3, wherein the first and second switching electrodes are disposed to be closer to the detective member than the first and second electrodes.

10. The capacitance type sensor according to claim 4, wherein the first and second switching electrodes are disposed to be closer to the detective member than the first and second electrodes.

11. The capacitance type sensor according to claim 2, wherein there are provided two or more groups of the first and second electrodes or two or more groups of the first and second switching electrodes.

12. The capacitance type sensor according to claim 3, wherein there are provided two or more groups of the first and second electrodes or two or more groups of the first and second switching electrodes.

13. The capacitance type sensor according to claim 4, wherein there are provided two or more groups of the first and second electrodes or two or more groups of the first and second switching electrodes.

14. The capacitance type sensor according to claim 5, wherein there are provided two or more groups of the first and second electrodes or two or more groups of the first and second switching electrodes.

* * * * *